(12) United States Patent
Yamamoto et al.

(10) Patent No.: US 8,285,953 B2
(45) Date of Patent: Oct. 9, 2012

(54) STORAGE SYSTEM GROUP

(75) Inventors: Akira Yamamoto, Sagamihara (JP);
Yoshiaki Eguchi, Yokohama (JP);
Yasutomo Yamamoto, Sagamihara (JP);
Manabu Kitamura, Kawasaki (JP); Ai Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1044 days.

(21) Appl. No.: 12/190,925

(22) Filed: Aug. 13, 2008

(65) Prior Publication Data

US 2009/0113153 A1 Apr. 30, 2009

(30) Foreign Application Priority Data

Oct. 24, 2007 (JP) ................................. 2007-276254
Jun. 10, 2008 (JP) ................................. 2008-151288

(51) Int. Cl.
*G06F 12/00* (2006.01)
(52) U.S. Cl. ................. 711/162; 711/E12.103
(58) Field of Classification Search .................... 711/162
See application file for complete search history.

(56) References Cited

U.S. PATENT DOCUMENTS

| | | | | |
|---|---|---|---|---|
| 7,117,327 B2* | 10/2006 | Hirakawa et al. | ............. | 711/162 |
| 2005/0198083 A1* | 9/2005 | Saika et al. | .................. | 707/204 |
| 2006/0026452 A1* | 2/2006 | Suzuki et al. | ..................... | 714/2 |
| 2006/0227756 A1* | 10/2006 | Rustagi et al. | ................. | 370/342 |
| 2007/0067586 A1 | 3/2007 | Mikami | | |
| 2007/0150677 A1* | 6/2007 | Homma et al. | ............... | 711/162 |
| 2007/0174669 A1 | 7/2007 | Ebata et al. | | |
| 2007/0180000 A1 | 8/2007 | Mine et al. | | |
| 2007/0220221 A1 | 9/2007 | Yamagami | | |
| 2007/0220326 A1 | 9/2007 | Ninose et al. | | |
| 2007/0233944 A1 | 10/2007 | Mori et al. | | |

FOREIGN PATENT DOCUMENTS

| | | |
|---|---|---|
| JP | 2002099454 | 4/2002 |
| JP | 2005-18738 | 1/2005 |
| JP | 2005216067 | 8/2005 |
| JP | 2007-80131 | 3/2007 |
| JP | 2007-133471 | 5/2007 |
| JP | 2007200182 | 8/2007 |
| JP | 2007219657 | 8/2007 |
| JP | 2007264917 | 10/2007 |

* cited by examiner

*Primary Examiner* — Kevin Ellis
*Assistant Examiner* — Aracelis Ruiz
(74) *Attorney, Agent, or Firm* — Brundidge & Stanger, P.C.

(57) ABSTRACT

There is a journal area and one or more logical volumes comprising a first logical volume. The journal area is a storage area in which is stored a journal data element, which is a data element that is stored in any storage area of a plurality of storage areas configuring a logical volume, or a data element that is written to the storage area. A controller has a size receiver that receives a write unit size, which is the size of a write data element received from a computer, and a size setting unit that sets the received write unit size in a memory for one or more logical volumes. The size of a journal data element stored in a journal area based on the set write unit size is the write unit size.

10 Claims, 26 Drawing Sheets

STORAGE SYSTEM GROUP

CROSS-REFERENCE TO PRIOR APPLICATION

This application relates to and claims the benefit of priority from Japanese Patent Application number 2007-276254, filed on Oct. 24, 2007, and Japanese Patent Application number 2008-151288, filed on Jun. 10, 2008 the entire disclosure of which are incorporated herein by reference.

BACKGROUND

The present invention generally relates to a storage system group configured by one or more storage systems, and more particularly to data backup.

For example, the snapshot function and journal function are known as functions of a storage system.

The snapshot function holds an image of a certain logical volume at a certain point in time (for example, the point in time at which a snapshot acquisition request was received from the host). Executing the snapshot function regularly makes it possible to intermittently acquire replications (backups) of data inside a logical volume. Further, when the snapshot function is used, it is possible to restore the logical volume of the point in time at which the snapshot was acquired.

When write data is written to a logical volume specified by a write command from the host computer, the journal function creates data (a journal) comprising this write data and control information related to the writing thereof, and stores the created journal.

Japanese Patent Application Laid-open No. 2005-18738 discloses a recovery process, which is executed at a point in time other than the point at which a snapshot was created by writing the write data inside a journal to a snapshot acquired via the snapshot function.

Japanese Patent Application Laid-open No. 2007-80131 has a disclosure for switching a snapshot and a journal.

Japanese Patent Application Laid-open No. 2007-133471 has a disclosure for manipulating a snapshot restore volume.

SUMMARY

Now then, generally speaking, the size of a data element (one unit of data) acquired as backup is the size of the unit storage area managed by the storage system.

However, the size of the write data element (one unit of write data) from the host is smaller than the size of the unit storage area managed by the storage system (or, even when the write data element is larger than the unit storage area, the size of the write data element does not constitute a multiple of the unit storage area size). In this case, when a write data element is stored in the unit storage area, a surplus space is generated in the unit storage area. Thus, a data element acquired as backup comprises a write data element and other information from the host, and as such constitutes a size that is larger than this write-date element. Therefore, there is the risk of information other than the write data element from the host also being stored as the backup data element.

Accordingly, an object of the present invention is to reduce the size of data acquired as backup.

A storage system comprises a physical storage device, which constitutes the basis of a journal area and one or more logical volumes comprising a first logical volume; and a controller, which receives a write command and a write data element from a higher-level device, and which writes the write data element to the first logical volume specified from the write command. The journal area is a storage area in which is stored a journal data element, which is a data element that is stored in any storage area of a plurality of storage areas configuring a logical volume, or a data element that is written to the storage area. The controller has a size receiver that receives a write unit size, which is the size of a write data element received from the higher-level device; and a size setting unit that sets the received write unit size in the memory for the one or more logical volumes. The size of a journal data element stored in the journal area and based on the set write unit size is the write unit size.

DESCRIPTION OF THE PREFERRED EMBODIMENTS

A number of embodiments of the present invention will be explained hereinbelow by referring to the figures.

Embodiment 1

Figure 1:
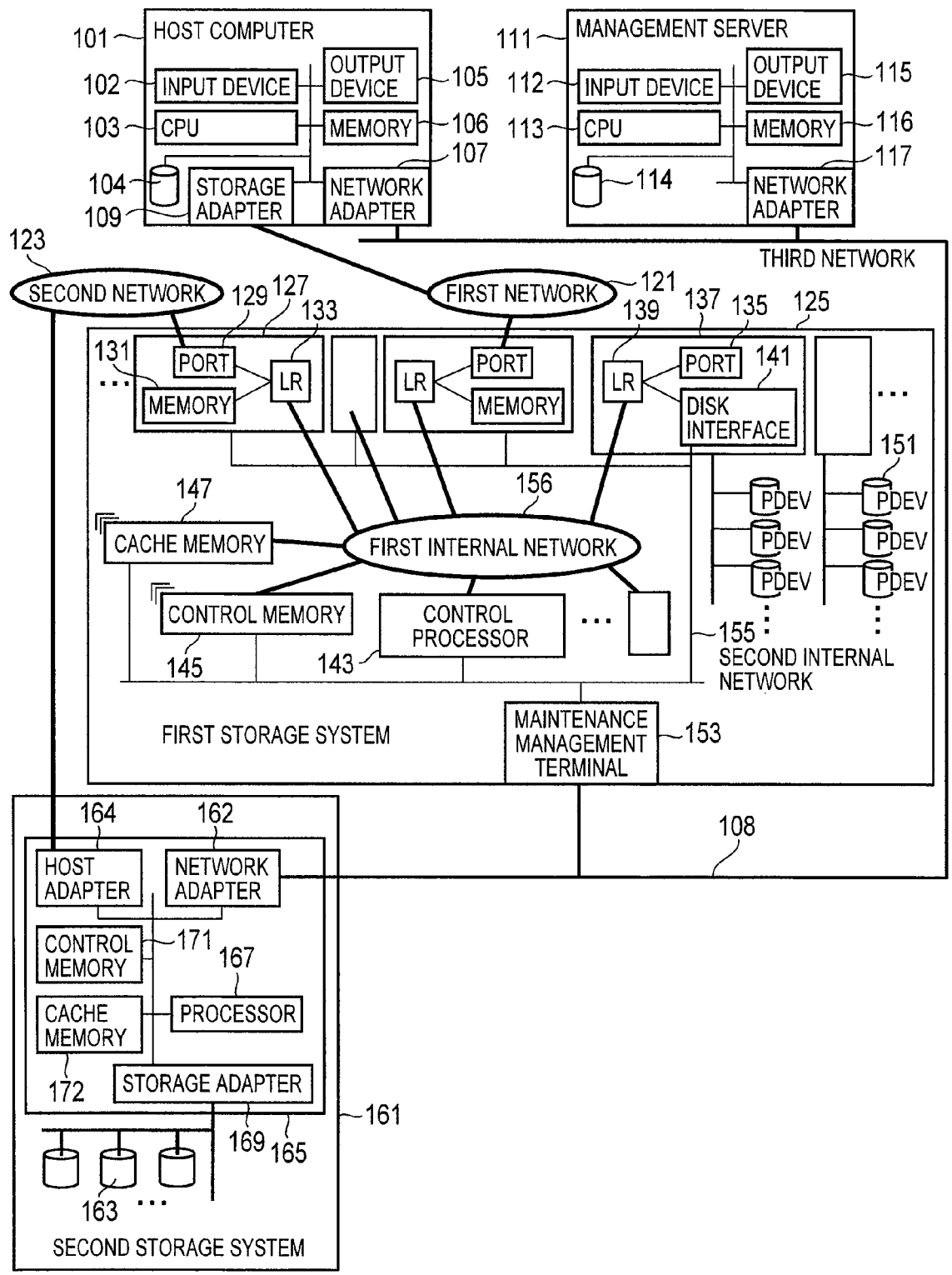
FIG. 1 shows the configuration of a computer system related to a first embodiment of the present invention.

FIG. 1 shows the configuration of a computer system related to a first embodiment of the present invention.

One or more host computers 101 and a first storage system 125 are connected to a first network 121. The first storage system 125 and a second storage system 161 are connected to a second network 123. The one or more host computers 101, a management server 111, and the first and second storage systems 125 and 161 are connected to a third network 108. The networks 121, 123 and 108 can each employ an arbitrary type of network. For example, the first and second networks 121 and 123 are SAN (Storage Area Network), and the third network 108 is a LAN (Local Area Network). Further, for example, the storage systems 125 and 161 can be connected via a leased line instead of the second network 123. Further, the second storage system 161 can be an external connection-destination storage system, or a remote copy-destination storage system.

The host computer 101 accesses a logical volume provided from the first storage system 125. The host computer 101 comprises a CPU (Central Processing Unit) 103, memory 106, auxiliary storage device 104, input devices (for example, a keyboard and a pointing device) 102, output device (for example, a display device) 105, storage adapter (for example, a host bus adapter) 109 connected to the first network 121, and a network adapter 107 connected to the third network 108. The CPU 103 sends an I/O command (either a write command or a read command) specifying an address via the storage adapter 109.

The management server 111 is a computer that manages the apparatuses 101, 111, 125 and 161 connected to the third network 108. The management server 111 comprises a CPU (Central Processing Unit) 113, memory 116, auxiliary storage device 114, input devices (for example, a keyboard and pointing device) 112, output device (for example, a display device) 115, and a network adapter 117 that is connected to the third network 108. The CPU 113 sends commands to the apparatuses 101, 111, 125 and 161 connected to the third network 108 via the network adapter 117.

The first storage system 125 has a controller and a storage device group. The controller, for example, comprises a plurality of front-end interfaces 127, a plurality of backend interfaces 137, a first internal network 156, one or more cache memories 147, one or more control memories 145, and one or more processors 143. The storage device group is configured from a plurality of physical storage devices (hereinafter, referred to as "PDEV") 151.

The front-end interface 127 is an interface circuit for communicating with either apparatus 101 or 161, which are external to the first storage system 125. Therefore, the front-end interface 127 can include an interface connected to the first network 121 and an interface connected to the second network 123. The front-end interface 127, for example, has a port 129 that is connected to either network 121 or 123, a memory 131, and a local router (hereinafter, abbreviated as "LR") 133. The port 129 and memory 131 are connected to the LR 133. The LR 133 carries out the distribution of data received by way of the port 129 for processing by an arbitrary processor 143. More specifically, for example, the configuration from a processor 143 to the LR 133 is such that an I/O command specifying a certain address is carried out by this processor 143, and the LR 133 distributes the I/O command and data in accordance with this configuration.

The backend interface 137 is an interface circuit for communicating with the PDEV 151. The backend interface 137, for example, has a disk interface 141 that is connected to the PDEV 151, a memory 135, and a LR 139. The disk interface 141 and memory 135 are connected to the LR 139.

The first internal network 156, for example, is configured from a switch (as one example, a crossbar switch) or a bus. The plurality of front-end interfaces 127, plurality of backend interfaces 137, one or more cache memories 147, one or more control memories 145, and one or more processors 143 are connected to the first internal network 156. Communications among these elements is carried out by way of the first internal network 156.

The cache memory 147 is a memory for temporarily storing either read-out or written data in accordance with an I/O command from the host computer 101.

Figure 4:
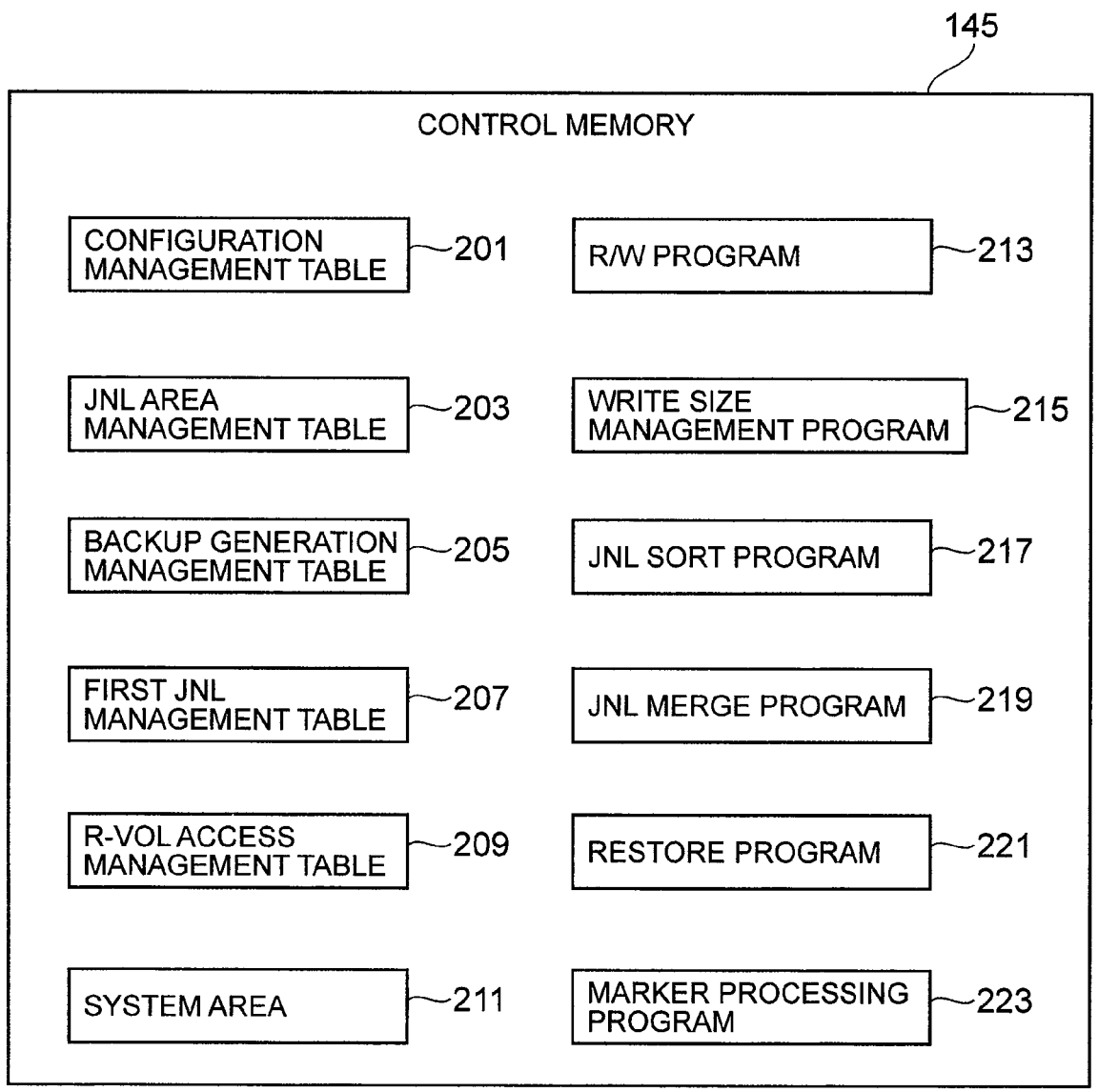
FIG. 4 shows the computer programs and information stored in the control memory inside the first storage system.

The control memory 145 is for storing various computer programs and/or information (for example, the computer programs and information shown in FIG. 4). For example, the control memory 145 stores information indicating which P-VOL (primary logical volume) is the VOL to be accessed from what host computer, information indicating which P-VOL configures a pair with which S-VOL (secondary logical volume), and information indicating which P-VOL is associated to which R-VOL (restored logical volume). From this information, it is possible to specify which S-VOL and R-VOL are logical volumes related to which host computer. As will be described hereinbelow, when the first storage system 125 receives the host write size for a certain host computer, the control processor 143 can specify the P-VOL, S-VOL and R-VOL related to this certain host computer by referencing information that is stored in the control memory 145, and can configure the host write size for the specified P-VOL, S-VOL and R-VOL.

The processor 143 carries out the processing described hereinbelow by executing the various computer programs stored in the control memory 145.

The PDEV 151 is a nonvolatile storage device, for example, a hard disk drive or a flash memory device. A RAID (Redundant Array of Independent Disks) group, which is a PDEV group that accords with RAID rules, is configured using two or more PDEV 151.

A second internal network (for example, a LAN) 155 is connected to the respective components 127, 137, 147, 145 and 143 of the controller, and a maintenance management terminal 153 is connected to this second internal network 155. The maintenance management terminal 153 is also connected to the third network 108, and is a computer for either maintaining or managing the first storage system 125. The maintenance personnel for the first storage system 125, for example, can operate the maintenance management terminal 153 (or the management server 111, which is capable of communicating with this terminal 153) to define various information to be stored in the control memory 145.

The second storage system 161 has a controller 165, and a group of PDEV 163. The controller 165, for example, has a host adapter 164, network adapter 162, control memory 171, cache memory 172, processor 167, and storage adapter 169. The functions of the host adapter 164, network adapter 162, control memory 171, cache memory 172, processor 167 and storage adapter 169 are respectively substantially the same as the functions of the front-end interface 127, network adapter 162, control memory 145, cache memory 147, processor 167, and backend interface 137.

Figure 2:
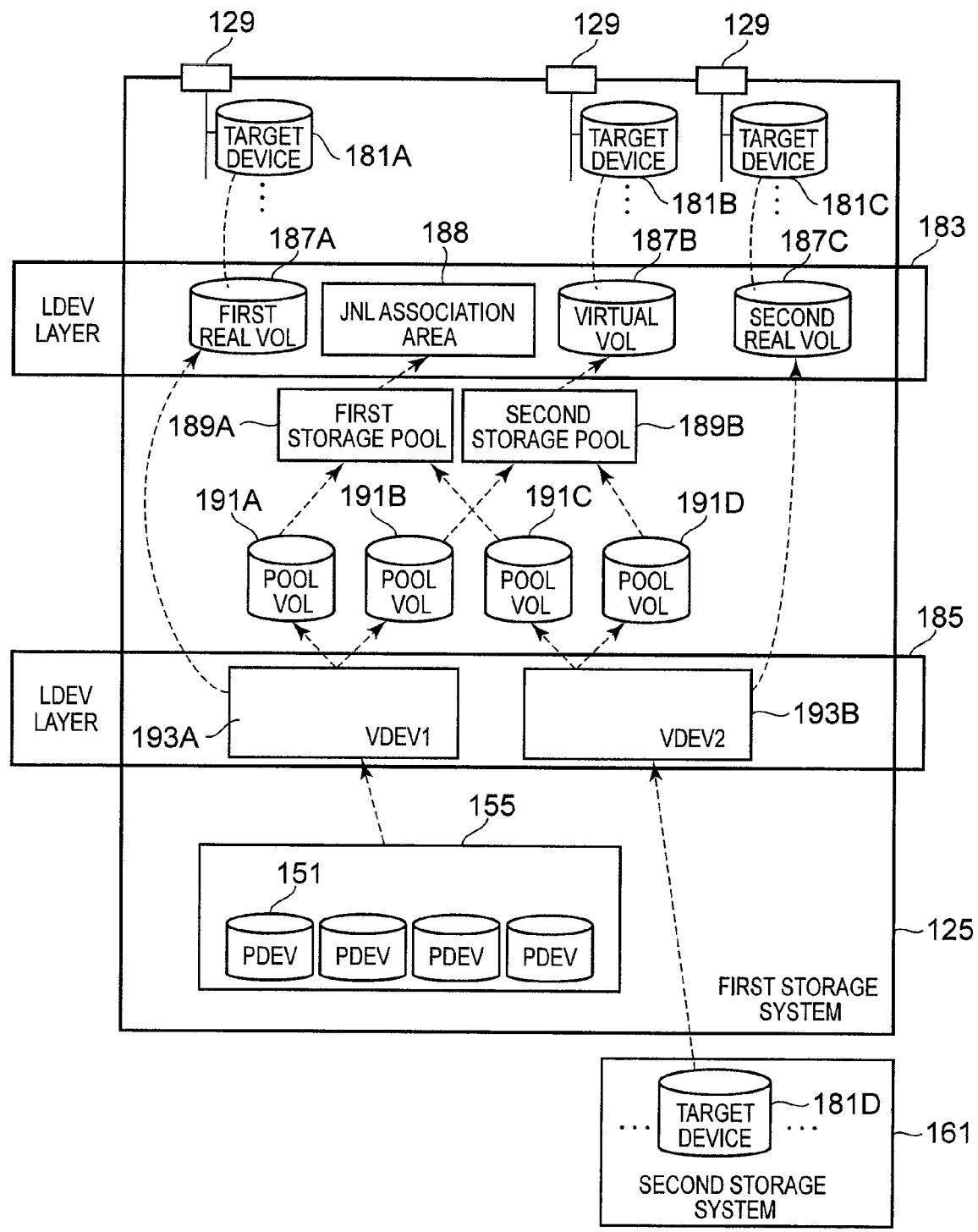
FIG. 2 shows an overview of the configuration of the storage area in a first storage system.

FIG. 2 shows an overview of the configuration of the storage area in the first storage system 125.

The logical storage hierarchy includes, in order from the lower-level to the higher-level, a VDEV layer 185, storage pools 189A and 189B, and an LDEV layer 183.

One or more virtual devices (VDEV) are in the VDEV layer 185. The VDEV is a storage area in which a prescribed address range is configured. Each of the plurality of storage area parts that configure this storage area is a logical volume.

In the example of FIG. 2, a first VDEV 193A is a substantive storage area provided by one RAID group 195. The first VDEV 193A, for example, constitutes the basis of a first real VOL 187A and pool VOL 191A and 191B. Therefore, data written to these logical volumes 187A, 191A and 191B is actually being written to the RAID group 195 that forms the basis of the first VDEV 193A.

Meanwhile, a second VDEV 193B is a virtual storage area. The second VDEV 193B constitutes the basis of a second real VOL 187C, and pool VOL 191C and 191D. Therefore, data written to these logical volumes 187C, 191C and 191D is actually written to storage resources (for example, a RAID group) inside the second storage system 161, which constitutes the basis of the second VDEV 193B. More specifically, for example, the storage area part corresponding to the second real VOL 187C is allocated to a target device 181D inside the second storage system 161, and, in this case, data written to the virtual VOL 187C is actually transferred to the second storage system 161, and written to the logical volume allocated to the target device 181D.

A storage pool is a cluster of one or more pool VOL. In the example of FIG. 2, a first storage pool 189A is a cluster of pool VOL 191A and 191C, and second storage pool 189B is a cluster of pool VOL 191B and 191D. Pool VOL 191A through 191D are logical volumes that are not associated to the target devices 181A through 181C (that is, logical volumes not provided to the host computer 101). Furthermore, all of the pool VOL inside the first storage system 125 can be created on the basis of the VDEV based on the RAID group inside the first storage system 125, and, by contrast, can also be created on the basis of the VDEV based on the storage resources inside the second storage-system 161.

There is a plurality of logical volumes 187A through 187C and a JNL association area 188 in the LDEV layer 183 ("JNL" is the abbreviation for journal). Unlike the pool VOL, all of the logical volumes 187A through 187C are capable of being recognized by the host computer 101. According to the example of FIG. 2, logical volume 187A is a substantive storage area (hereinafter referred to as the "first real VOL") inside the first storage system 125. Logical volume 187B is a virtual logical volume (hereinafter referred to as a "virtual VOL") associated to storage pool 189B. For example, virtual VOL 187B is configured from a plurality of virtual areas, and storage pool 189B is configured from a plurality of pool areas. As a result of data being written to a virtual area inside virtual VOL 187B, a pool area is allocated from storage pool 189B to this virtual area, and the write-targeted data is written to this pool area. If this pool area belongs to pool VOL 191B, the data is stored inside the first storage system 125, and if this pool area belongs to pool VOL 191D, this data is stored inside the second storage system 161.

The JNL association area 188 is a storage area that is not provided to the host computer 101. This area 188, for example, exists inside the first storage pool 189. This area 188 is configured by a JNCB area, which will be described further below, and a JNL area. "JNCB" is a character string that signifies a second JNL management table to be described below.

The target devices 181A through 181C are seen as logical devices by the host computer 101, and more specifically, for example, are LUN (Logical Unit Number) in an open system, and "devices" in a mainframe system. Target devices 181A through 181C are associated to a port 129 and to logical volumes 187A through 187C in the LDEV layer 183. According to the example of FIG. 2, an I/O (either a write or a read) occurs in the first real VOL 187A associated to target device 181A when this device 181A is specified in an I/O command, an I/O occurs in virtual VOL 187B associated to target device 181B when this device 181B is specified, and an I/O occurs in a second real VOL 187C associate to target device 181C when this device 181C is specified.

Figure 3:
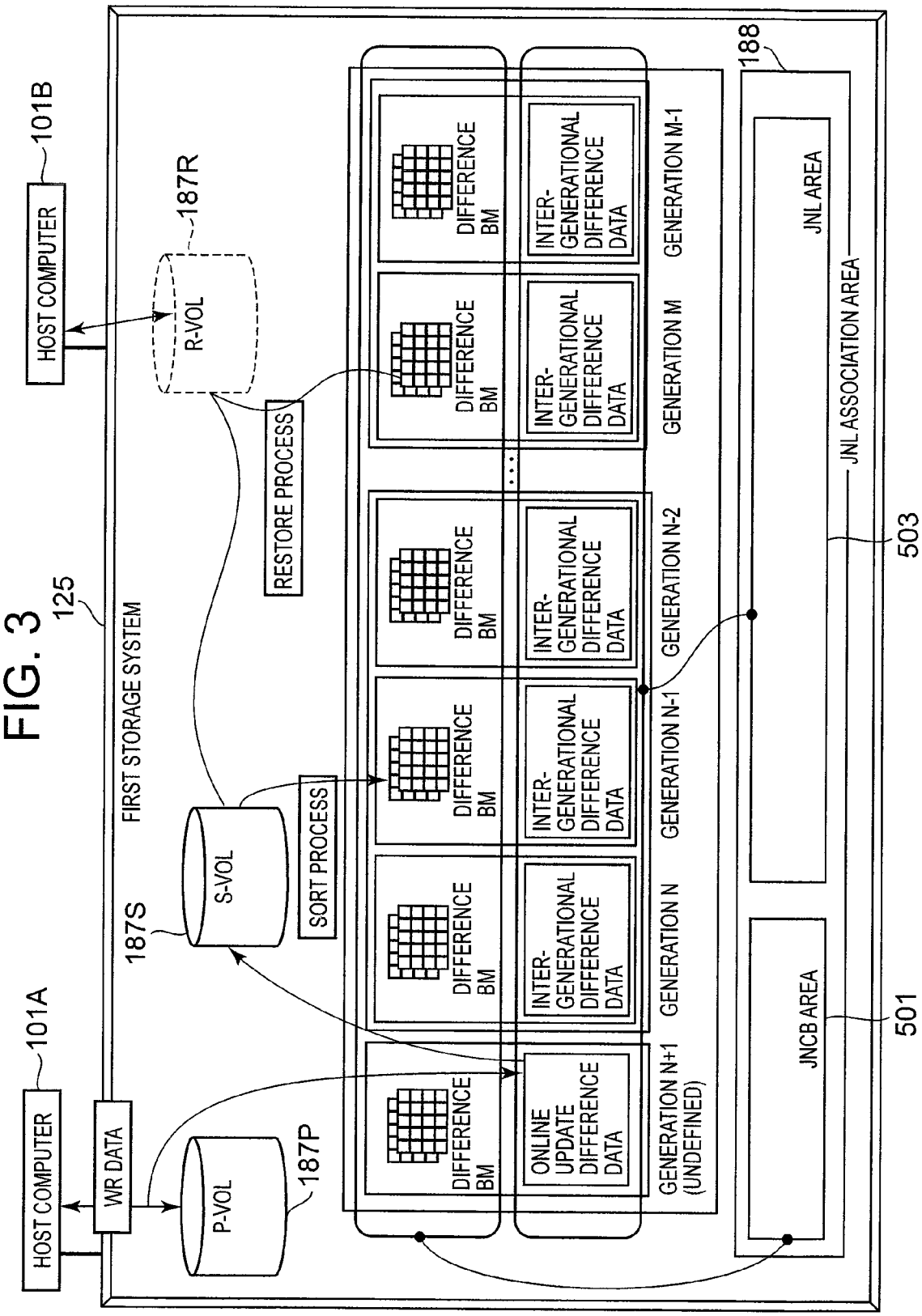
FIG. 3 shows an overview of the storage of a JNL data element.

FIG. 3 shows an overview of the storage of a JNL data element. Furthermore, in FIG. 3, the word "write" is abbreviated as "WR", and write may also be abbreviated in this way in other figures as well.

A P-VOL 187P and an S-VOL 187S are in the first storage system 125. Further, P-VOL 187P and S-VOL 187S, which can construct R-VOL 187R, for example, are either the above-described first or second real VOL 187A or 187C, and R-VOL 187R is the above-described virtual VOL 187B.

P-VOL 187P is a primary logical volume (online logical volume). P-VOL 187P is updated by write data being written in from the host computer 101.

S-VOL 187S is a secondary logical volume that is paired up with the P-VOL 187P, and has the same storage capacity as the P-VOL 187P.

The R-VOL 187R is a logical volume that has the contents of a specified generation of the P-VOL 187P. The R-VOL 187R is a virtual volume like that described hereinabove, and, as will be explained further below, is created in response to a request from the user or administrator.

The JNL association area 188, as described above, is configured from a JNCB area 501 and a JNL area 503. As shown in FIG. 3, a difference BM (BM is the abbreviation for "bitmap") corresponding to an undefined generation and a difference BM corresponding to each defined generation are stored in the JNCB area 501. Online update difference data corresponding to an undefined generation and online update difference data corresponding to each defined generation are stored in the JNL area 503.

Here, a "generation" is a certain point in time of the P-VOL 187P. For example, generation (N) is subsequent to generation (N−1), and is a time when a prescribed generation definition event occurred in the P-VOL 187P (in this embodiment, the time when a marker, which will be explained below, was received from the host computer 101). Furthermore, in the example of FIG. 3, since the latest generation that has been defined is generation (N), the undefined generation is generation (N+1). Because an image of the P-VOL 187P at the time the marker was received is acquired by the first storage system 125, the marker can also be called a snapshot acquisition request.

"Online update difference data" is an aggregate of online update difference data elements. The "online update difference data element" is a JNL data element of the P-VOL 187P.

The "JNL data element" is an amount of JNL data the size of a P-VOL 187P unit storage area (the host write size explained hereinbelow). The JNL data element can be either an after JNL data element or a before JNL data element. The "after JNL data element" is a write data element in the P-VOL 187P. The "before JNL data element" is a data element (data element stored in the write-destination storage area of a write data element) that has been saved from the P-VOL 187P via a COW (Copy On Write) as a result of a write data element being written to the P-VOL 187P. In the following explanation, the unit storage area (the unit storage area managed in host write size units, which will be described hereinbelow) in which a data element inside a logical volume is stored may for the sake of convenience be called a "block", and the storage area in which a data element inside the JNL area 503 is stored may for the sake of convenience be called a "segment". Further, in the following explanation, it is supposed that an online update difference data element is an after JNL data element.

Furthermore, the maximum size of online update difference data is the same size as the P-VOL corresponding to this data. This is because the online update difference data element that corresponds to the same block of the corresponding P-VOL is overwritten inside the JNL area 503. Therefore, the maximum size of the inter-generational difference data described hereinbelow is also the same as the size of the P-VOL corresponding to this data. In other words, the size of the JNL sub-area of the write destination of the online update difference data element is the maximum size, and can be made the same size as the P-VOL (This point is also the same for the inter-generational difference data and the merge difference data to be described hereinbelow).

The "inter-generational difference data" is an aggregate of inter-generational difference data elements. The "inter-generational difference data element" is a data element that is saved from the S-VOL 187S in accordance with a COW resulting from an online update difference data element being written to the S-VOL 187S. More specifically, for example, in a case when the undefined generation is generation (N), when the first storage system 125 receives a marker (specified electronic data) from the host computer 101, generation (N) is defined, and the undefined generation becomes (N+1). In this case, online update difference data accumulated in the JNL area 503 (that is, data equivalent to the difference between the generation (N) P-VOL 187P and the generation (N−1) P-VOL 187P) is written to the S-VOL 187S. Each time an online update difference data element is written, a data element from the S-VOL 187S is saved to the JNL area 503 via the COW as an inter-generational difference data element. Accordingly, the S-VOL 187S becomes a replicate of the generation (N) P-VOL 187P, and inter-generational difference data corresponding to generation (N−1) (that is, data equivalent to the difference between the generation (N−1) S-VOL 187S and the generation (N−2) S-VOL 187S) is stored in the JNL area 503. Thus, the S-VOL 187S generation is the generation immediately preceding the P-VOL 187P generation.

The "difference BM" is a bitmap indicating the difference between the generations of a logical volume. More specifically, for example, in the example of FIG. 3, the difference BM corresponding to generation (N) is the bitmap indicating the difference between the generation (N) P-VOL 187P and the generation (N−1) P-VOL 187P. When the write data element is first written to a certain block inside the P-VOL 187P at a certain point in time later than generation (N−1), the bit corresponding to this certain block (the bit inside the difference BM corresponding to generation (N)) is turned ON (that is, the value indicating the occurrence of a write (for example, "1") is updated), and the online update difference data element corresponding to this write data element is stored in the JNL area 503. Furthermore, the respective bits that configure the difference BM correspond to the respective blocks of the P-VOL 187P. The size of the respective blocks constitutes the host write size in accordance with formatting that will be explained by referring to FIG. 7. The "host write size" is the unit size of data written from the host computer 101 (the size of the write data element).

Furthermore, as will be explained further below by referring to FIGS. 11 and 12, it is possible to merge a plurality of generations' worth of inter-generational difference data and difference BM. Consequently, it is possible to reduce the storage capacity that is consumed. Hereinbelow, post-merge inter-generational difference data will be referred to as "merged difference data".

Further, in FIG. 3, a sort process and a restore process are shown. Overviews of the respective processes are as follows.

<Sort Process> Online update difference data elements are lined up (spread out) chronologically in the JNL area 503 (that is, in the order in which they were written to the JNL area 503). When the online update difference data is read out from the JNL area 503 and written to the S-VOL 187S, the online update difference data elements are read out in the order of the addresses of the P-VOL 187P (either ascending or descending address order) instead of chronologically. Thus, the online update difference data elements are written to the S-VOL 187S in address order, and as such, the inter-generational difference data elements written to the JNL area 503 from the S-VOL 187S via a COW become lined up (become spread out) in the address order of the P-VOL 187P. The process by which inter-generational difference data is lined up in address order in the JNL area 503 by reflecting the chronologically arranged online update difference data elements in the S-VOL 187S in address order is the "sort process". Furthermore, as in the third embodiment explained hereinbelow, a sort process in a case when there is no online update difference data is carried out so as to line up inter-generational difference data in address order in the JNL area 503.

<Restore Process> The "restore process" creates the R-VOL 187R in response to a request from either the user or the administrator. It is possible to read from the R-VOL 187R. Further, it is also possible to write to the R-VOL 187R. Read and write processes for the R-VOL 187R will be explained further below by referring to FIGS. 14 and 15.

FIG. 4 shows computer programs and information stored in the control memory 145. In the following explanation, a process described as being performed by a program is actually carried out by the processor 143 that executes this program.

The control memory 145 stores a configuration management table 201, JNL area management table 203, backup generation management table 205, first JNL management table 207, R-VOL access management table 209, R/W program 213, write size management program 215, JNL sort program 217, JNL merge program 219, restore program 221, and marker processing program 223. The control memory 145 also has a system area 211. The R/W program 213 controls I/O in accordance with an I/O command from the host computer 101. The write size management program 215 configures the host write size. The JNL sort program 217 executes a sort process. The JNL merge program 219 merges a plurality of generations of inter-generational difference data. The restore program 221 creates the R-VOL 187R. The marker processing program 223 processes a marker from the host computer 101. The various programs and information stored in the control memory 145 will be explained in detail below. Further, in the following explanation, logical volume may be abbreviated as "VOL".

Figure 5:
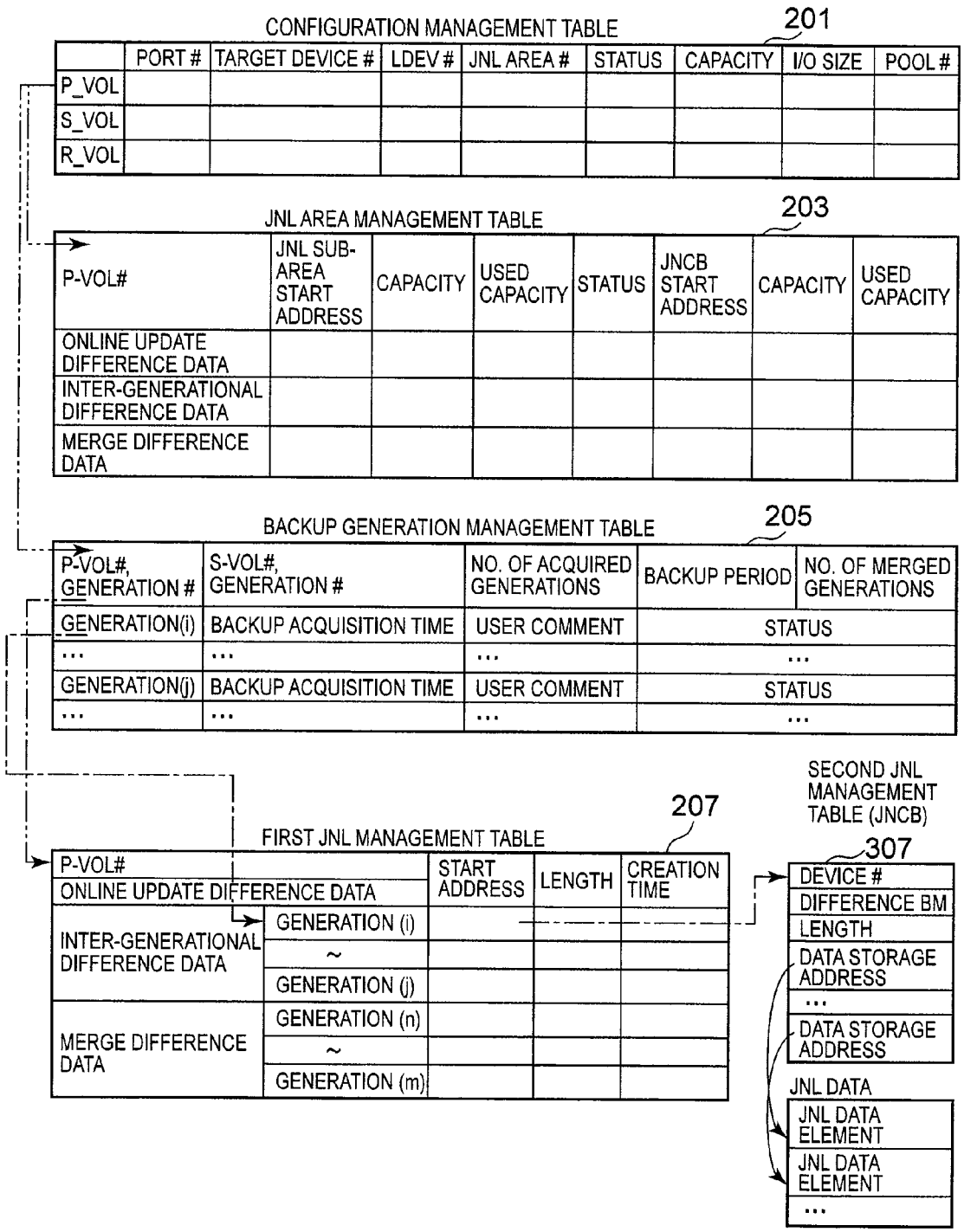
FIG. 5 shows examples of the configuration management table, JNL area management table, backup generation management table and first JNL management table shown in FIG. 4.

FIG. 5 shows examples of the configuration management table 201, JNL area management table 203, backup generation management table 205, and first JNL management table 207 shown in FIG. 4. Furthermore, FIG. 5 also shows a second JNL management table (JNCB) 307 and JNL data managed by a JNCB 307 that are not shown in FIG. 4, but the JNCB 307 and JNL data are stored in the PDEV group (the storage pool in the example described hereinabove) without being stored in the control memory 145.

The configuration management table 201 is provided in each P-VOL, and is for managing the P-VOL and S-VOL and the R-VOL related thereto. In the configuration management table 201, for example, are recorded a "port #" (number of the port allocated to the target device corresponding to the VOL), "target device #" (number of the target device corresponding to the VOL), "LDEV #" (number for identifying the VOL), "JNL area #" (number of the JNL area corresponding to the VOL from among a plurality of JNL areas), "status" (the status of the VOL, for example, the access restriction status, such as R/W prohibited or R only), "capacity" (the capacity of the VOL), "I/O size" (the above-mentioned host write size), and "pool #" (number of the storage pool allocated to the VOL) for each VOL of the P-VOL, and the S-VOL and R-VOL related thereto.

The JNL area management table 203 is provided in each P-VOL, and is for managing the location of online update difference data, inter-generational difference data and merge difference data corresponding to the P-VOL. More specifically, there is a "JNL sub-area start address" (address indicating the start of the JNL sub-area), "capacity" (capacity of the JNL sub-area corresponding to the data), "used capacity" (capacity occupied by data), "status" (for example, 'normal' if it is a state in which the JNL sub-area can be used normally, 'blockage' if the JNL sub-area cannot be used for one reason or another, 'insufficient capacity' if the free capacity of the JNL (the difference between the capacity and the used capacity) is less than a prescribed threshold), "JNCB start address" (address indicating the start of the JNCB), "capacity" (capacity of the JNCB), and "used capacity" (the capacity occupied by a JNCB group) for each of the online update difference data, inter-generational difference data, and merge difference data. Furthermore, the "JNL sub-area" is one part of the JNL area 503. Further, for the inter-generational difference data and merge difference data, a "JNL sub-area start address", "capacity", "used capacity", "status", "JNCB start address", "capacity" and "used capacity" are registered for each generation.

The backup generation management table 205 is provided for each P-VOL, and is for managing backup data related to the P-VOL. In the backup generation management table 205, for example, there is recorded a "P-VOL #" (number of the P-VOL), "generation #" (number indicating the latest generation), "S-VOL #" (number of the S-VOL that configures a pair with the P-VOL), "generation #" (number indicating the latest generation of the S-VOL), "number of acquired generations" (number of generations of backups for the P-VOL), "backup period" and "number of merged generations" (whether a merge process was executed when a certain number of generations' worth of inter-generational difference data had accumulated). The backup generation management table 205 also has for each generation of the P-VOL a "generation #" (number indicating the generation), "backup acquisition time" (when a backup was acquired (in other words, the date and time at which the marker, which constituted the reason for defining this generation), was received), "user comment" (arbitrary user information for the user to manage a backup), backup "status" (for example, whether a backup was a success or a failure).

The first JNL management table 207 is provided for each P-VOL, and is for managing the online update difference data, inter-generational difference data, and merge difference data corresponding to the P-VOL. For online update difference data, for example, there is recorded a "start address" (start address of the JNCB), "length" (size of the online update difference data, for example, the number of online update difference data elements), "creation time" (time at which the online update difference data element was stored (for example, the time at which the marker, which constituted the reason for defining the latest generation), was received). Further, for the inter-generational difference data, "start address", "length" and "creation time" are recorded for each generation. Furthermore, the "creation time" here is the time at which corresponding inter-generational difference data was stored in the JNL sub-area. Similarly, for the merge difference data, a "start address", "length" and "creation time" are also recorded for each generation. Furthermore, "generation" here is a certain generation of a plurality of generations corresponding to the merge difference data (for example, either the latest or the oldest generation), and "creation time" is the time at which corresponding merge difference data was stored in the JNL sub-area. Referencing the "start address" corresponding to online update difference data and other such JNL data makes it possible to reference the JNCB corresponding to this JNL data.

The JNCB 307 exists for each generation for both the inter-generational difference data and the merge difference data. The JNCB 307 is a table for managing the locations of a difference BM and data element corresponding to a generation. More specifically, for example, the JNCB table 307 records a "device #" (number of the corresponding P-VOL), "length" (length of the corresponding JNL data (online update difference data, inter-generational difference data or merge difference data)), "difference BM" (difference BM corresponding to a generation), and data storage address corresponding to the respective JNL data elements that configure the corresponding JNL data.

Figure 6:
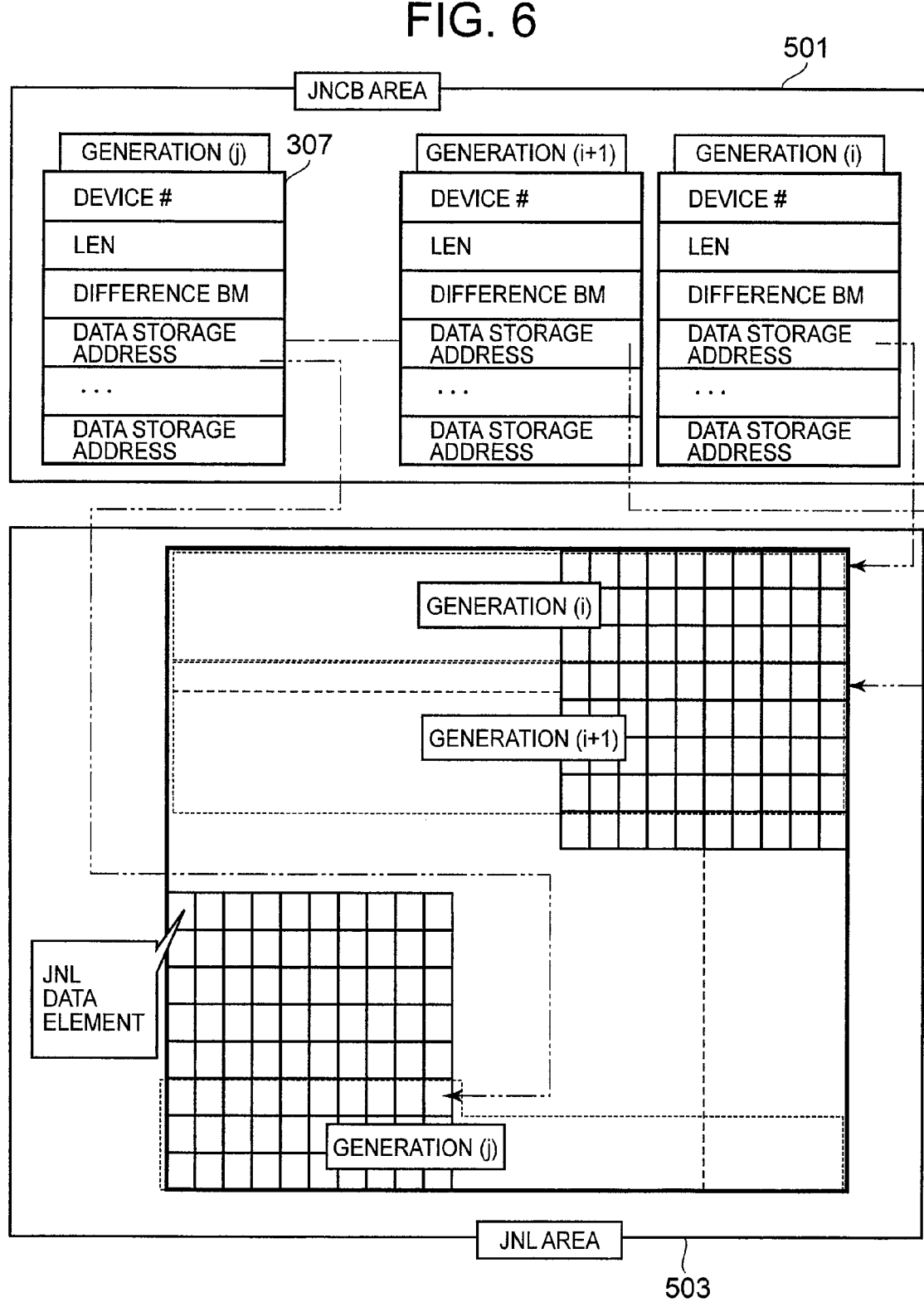
FIG. 6 shows a data management scheme that takes inter-generational difference data as an example from among online update difference data, inter-generational difference data and merge difference data.

FIG. 6 shows a data management system that takes inter-generational difference data as an example from among online update difference data, inter-generational difference data and merge difference data.

As shown in FIG. 6, a plurality of JNCB corresponding to a plurality of generations is stored in the JNCB area 501, and a plurality of JNL sub-areas corresponding to this plurality of generations exists in the JNL area 503.

From the difference BM inside the JNCB 307 corresponding to a specified generation (for example, generation (i)), it is possible to learn where in the P-VOL of that generation there was an update. Further, referencing the respective data storage addresses recorded in the JNCB 307 corresponding to this generation makes it possible to learn where inside the JNL area 503 the respective data elements, which configure the inter-generational difference data corresponding to this generation, exist.

Figure 7:
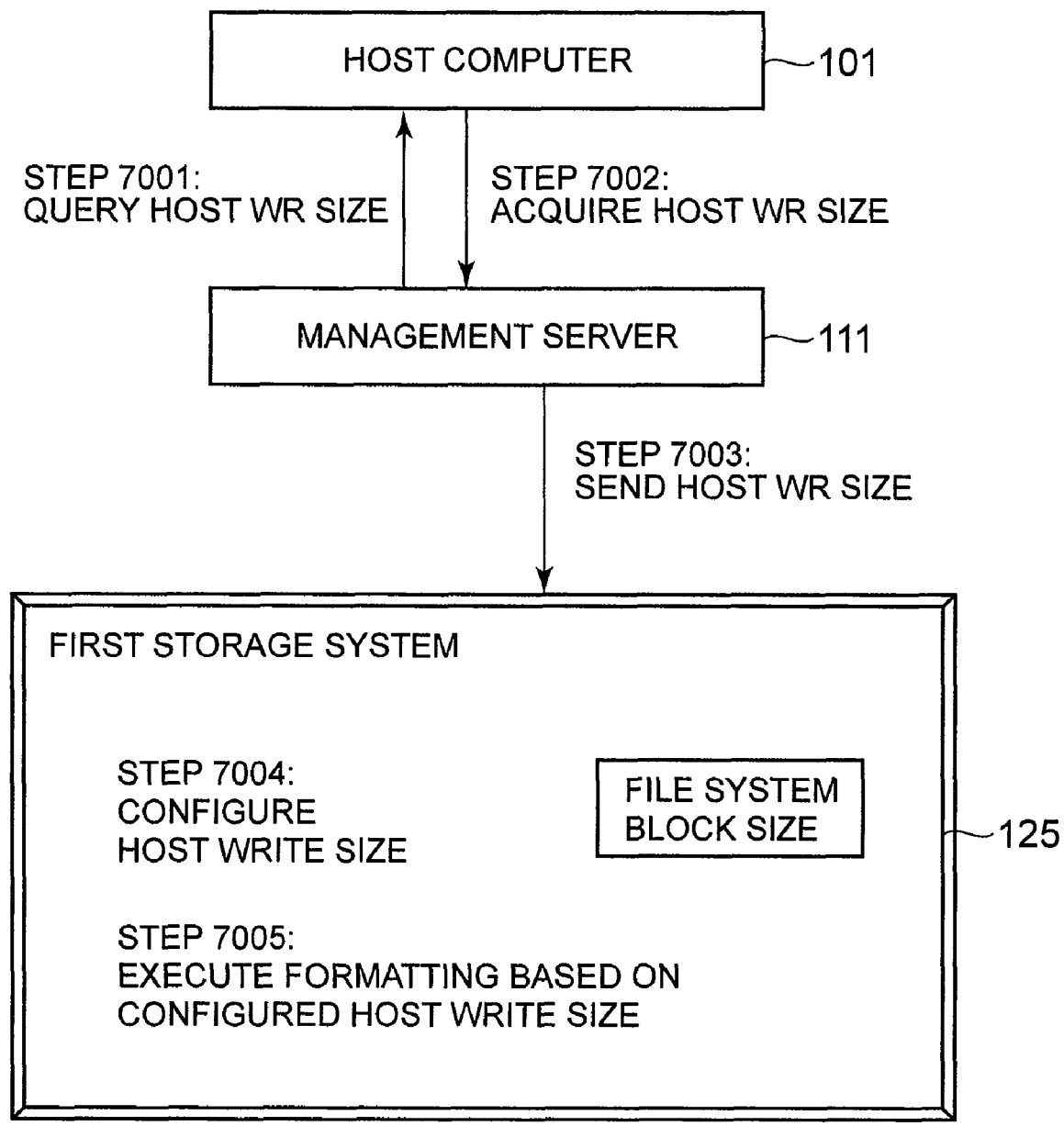
FIG. 7 shows the flow of a host write size configuration process.

FIG. 7 shows the flow of the process for configuring the host write size.

The management server 111 issues a host write size query to the host computer 101 (Step 7001). The host write size from the host computer 101 is sent as a reply by a prescribed computer program inside the host computer 101 (a computer program that has a function for replying with a host write size in response to the above-mentioned query) being executed by the CPU 103 (Step 7002). This prescribed computer program, for example, can include a file system or a database management system (DBMS).

The management server 111 sends the replied host write size and the host identifier (or P-VOL number) corresponding to this host write size to the first storage system 125 (and the second storage system 161).

The write size management program 215 (refer to FIG. 4) specifies the respective P-VOL corresponding to the host identifier (or P-VOL number) from the management server 111, and configures the host write size from the management server 111 in the configuration management tables 201 corresponding to these respective P-VOL as the I/O size (Step 7004).

Then, the write size management program 215 executes a formatting process based on this host write size (Step 7005). In the formatting process, for example, the JNL area management table 203, backup generation management table 205, first JNL management table 207 and JNCB 307 corresponding to the above-described specified respective P-VOL are created. More specifically, for example, the size of the block that configures the P-VOL, and the size of the segment that configures the JNL area 503 are managed as being the same size as the host write size. Therefore, the number of bits configuring the difference BM inside the JNCB 307 constitutes the number of blocks obtained by the P-VOL being delimited by the host write size. Consequently, for example, the size of the online update difference data element, the size of the data element saved from the S-VOL, or the size of the data element copied from the P-VOL to the S-VOL becomes the host write size.

Furthermore, when the host write size is not configured as the I/O size, the size of the created JNL data element is the initial value of the I/O size (for example, the unit management size of the cache memory 147, or the unit management block size of the file system). Further, the write size management program 215 can also receive the host write size from the host computer 101. Further, the block size, the block size of the S-VOL that configures a pair with the P-VOL, and the segment size of the JNL sub-area related to the P-VOL may differ for each P-VOL. This is because the host write size can also differ if the host computer 101 (or operating system) that uses the P-VOL differs. More specifically, for example, the block size of the P-VOL accessed from a first type host computer is a first host write size corresponding to this first type host computer, and the block size of the P-VOL accessed from a second type host computer can constitute a second host write size, which corresponds to this second type host computer, and which differs from the first host write size.

Figure 8:
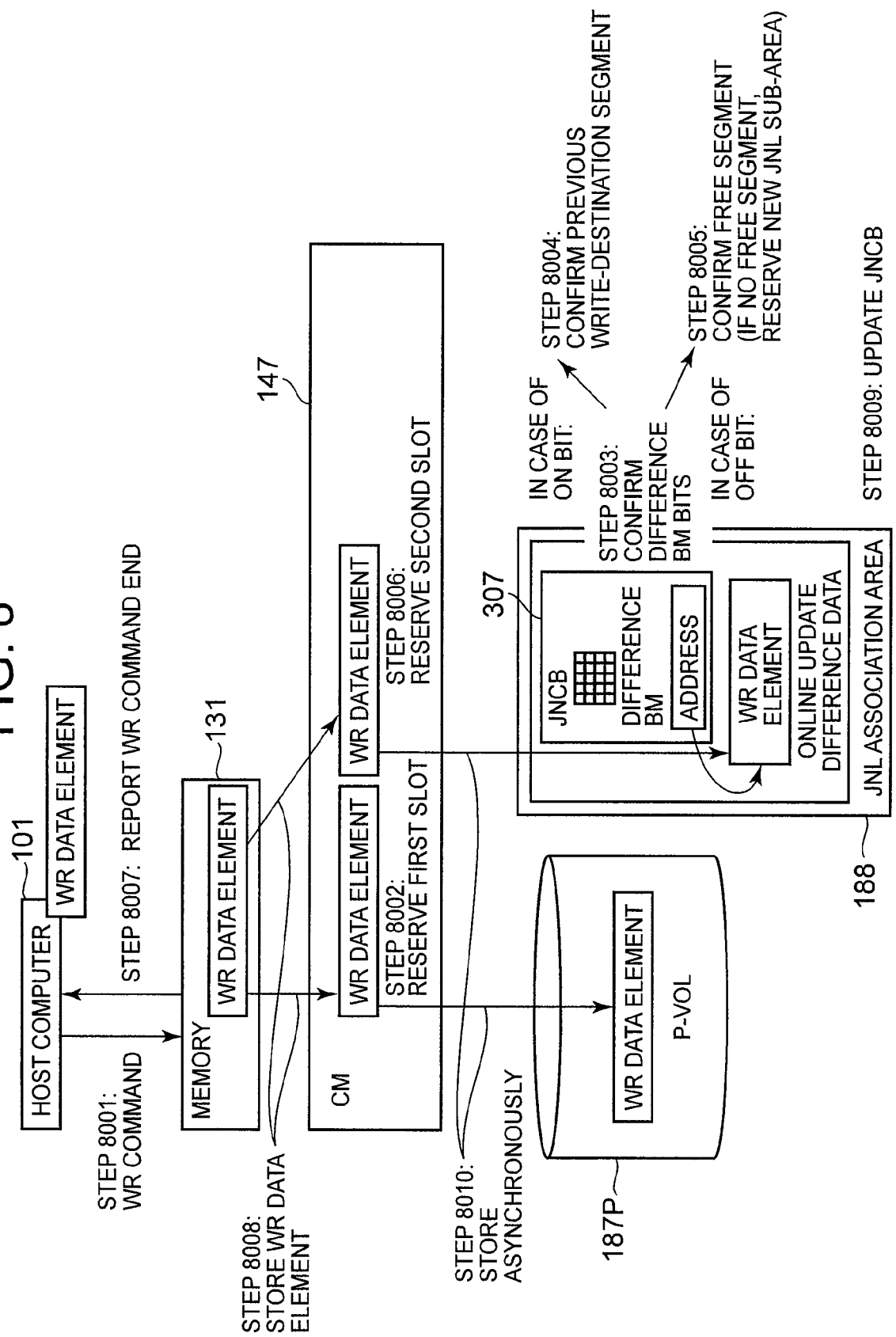
FIG. 8 shows the flow of a write process that writes a write data element to a P-VOL.

FIG. 8 shows the flow of a write process that writes a write data element to the P-VOL. Hereinafter, each P-VOL that is specified by the write command will be referred to as the "target P-VOL" in the explanation of FIG. 8. Further, in the following explanation, to prevent the explanation from becoming redundant, a target corresponding to generation K will be expressed by appending (K) after the name of this target. More specifically, for example, a JNCB corresponding to generation (j) will be expressed as "JNCB (j)", and an S-VOL corresponding to generation (j−1) will be expressed as "S-VOL (j−1)".

The front-end interface 127 receives a write command and write data element from the host computer 101, and stores the write data element in memory 137 (Step 8001). The write command is transferred to the processor 143.

The R/W program 213 (Refer to FIG. 4) reserves a first slot from the cache memory 147 in response to write command reception (Step 8002). Furthermore, the "slot" is the unit management area of the cache memory 147. The slot size, for example, is larger than the host write size. When the host write size has not been configured, for example, a JNL data element is created in the slot size as the initial value.

The R/W program 213 references the bit corresponding to the write-destination block specified by the write command in the difference BM (latest difference BM) that corresponds to an indefinite point in time of the target P-VOL 187P (Step 8003).

If this bit is indicated as having been updated, the R/W program 213 references the data storage address corresponding to this bit, and specifies the segment indicated by this address (Step 8004).

Conversely, if the bit referenced in Step 8003 is indicated as not having been updated, the R/W program 213 specifies a free segment inside the JNL sub-area corresponding to the online update difference data for the target P-VOL 187P by referencing the JNL area management table 203 corresponding to the target P-VOL 187P (Step 8005). Furthermore, if there is no free segment, a new JNL sub-area can be reserved.

The R/W program 213 reserves a second slot from the cache memory 147 (Step 8006).

The R/W program 213 reports the end of the write command to the host computer 101 that was the source of the write command (Step 8007). In response to this, the write data element is sent from the host computer 101 and stored in the memory 131 of the front-end interface 127.

The R/W program 213 respectively writes the write data elements stored in the memory 131 of the front-end interface 127 to the first and second slots (Step 8008).

The R/W program 213 updates the JNCB 307 corresponding to the online update difference data of the target P-VOL 187P (Step 8009). More specifically, for example, the data storage address, which corresponds to the destination segment (referred to in the explanation of FIG. 8 as the "JNL-destination segment") in which the write data element is written as the online update difference data element, is added. Further, for example, if the write-destination block has not been updated, the bit (bit inside the difference BM) corresponding to the write-destination block is updated to ON (the value indicating updated).

The R/W program 213 writes the write data element inside the first slot to the write-destination block inside the target P-VOL 187P, and writes the write data element inside the second slot to the above-mentioned JNL-destination segment (the segment specified in either Step 8004 or 8005) (Step 8010). The write data elements inside the first and second slots can be written at the same time, or can be written at different times.

Figure 9:
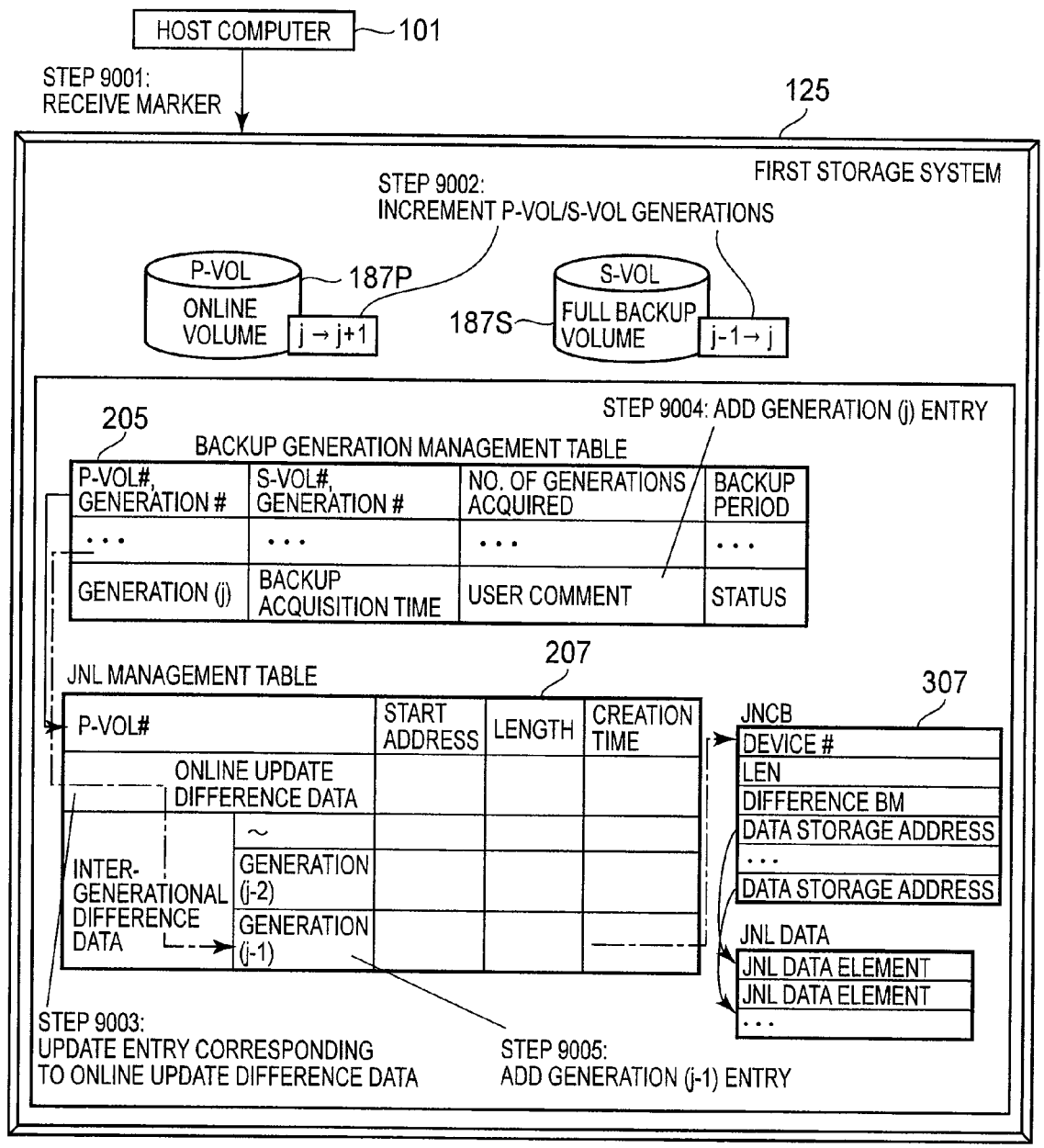
FIG. 9 shows marker reception and the flow of processing carried out in response to marker reception.

FIG. 9 shows the marker reception and the flow of processing carried out in response to marker reception. Furthermore, in the explanations of FIG. 9 and the subsequent FIG. 10, a P-VOL specified by a marker will be referred to as the "target P-VOL", and an S-VOL that configures a pair with a target P-VOL will be referred to as the "target S-VOL".

The front-end interface 127 receives a marker from the host computer 101 (Step 9001). The received marker is transferred to the processor 143.

The marker processing program 223 respectively increments by 1 the generations of the target P-VOL 187P and the target S-VOL 187S in response to receiving the marker (Step 9002). For example, the generation of the target P-VOL 187P is updated from j to j+1, and the generation of the target S-VOL 187S is updated from j−1 to j. More specifically, for example, the respective generation # of the target P-VOL and target S-VOL are updated in the backup generation management table 205. That is, generation (j) of the target P-VOL 187P is defined, and generation (j+1) is the undefined generation.

The marker processing program 223 adds the "start address", "length" and "creation time" corresponding to the online update difference data (j+1) to the first JNL management table 207 (Step 9003). That is, a JNL sub-area in which the online update difference data (j+1) is to be stored is prepared. Consequently, the online update difference data (j) of the marker reception value need not be overwritten by the online update difference data (j+1).

The marker processing program 223 adds the defined generation (j) row to the backup generation management table 205, and registers the backup acquisition time (marker reception time) and a user comment received at the same time as marker reception in this row (Step 9004).

The marker processing program 223 adds a generation (j−1) row for the inter-generational difference data to the first JNL management table 207 (Step 9005). At this time, JNCB (j−1) is created based on the "I/O size" (that is, the host write size) of the S-VOL (more specifically, for example, the number of bits configuring the difference BM (j−1) is used as the number of blocks for this "I/O size"). The start location of JNCB (j−1) is written in the added row as the "start address". JNCB (j−1) is updated on the basis of the sort process. This sort processing will be explained by referring to FIG. 10.

Figure 10:
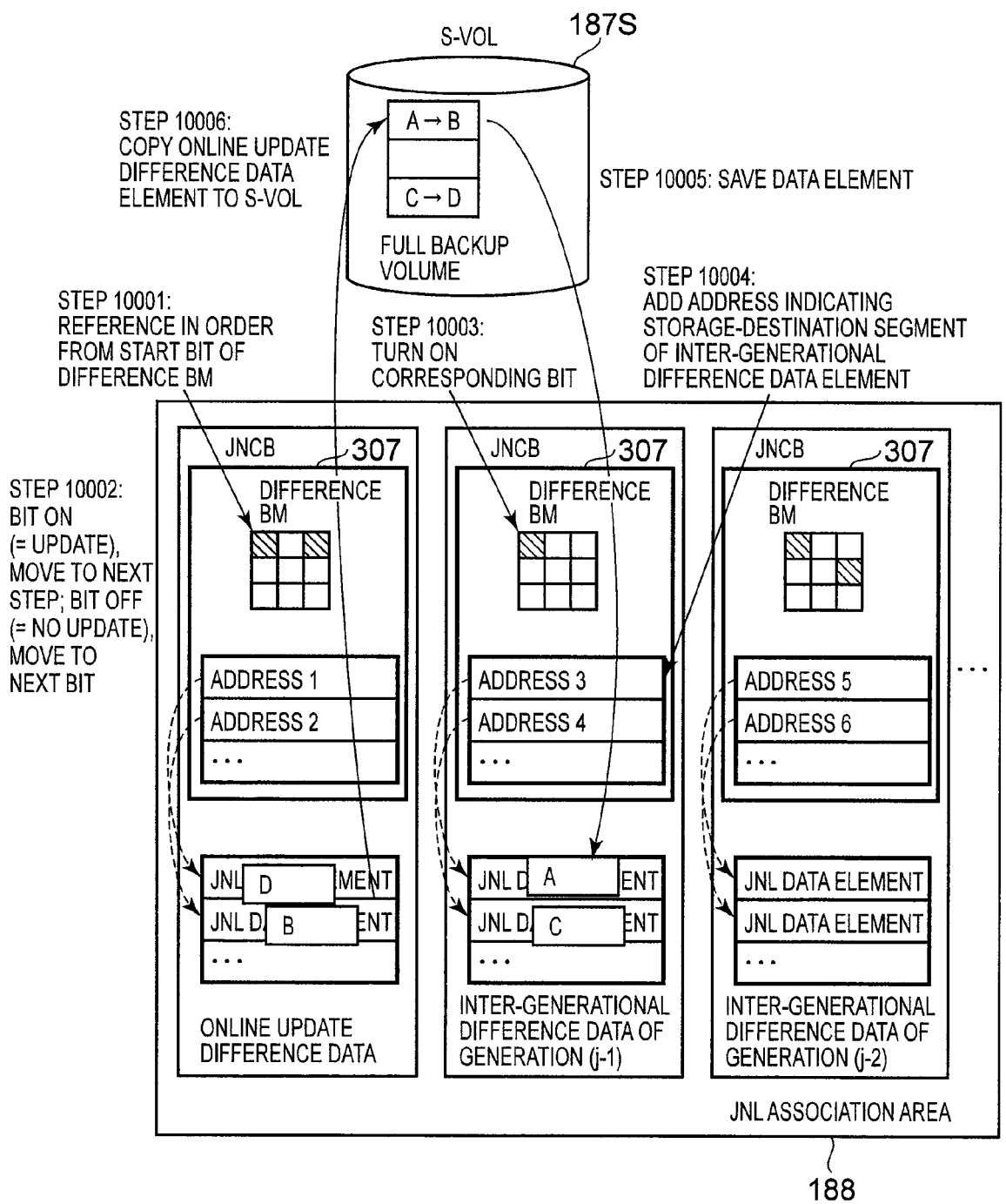
FIG. 10 shows the flow of a sort process of the first embodiment.

FIG. 10 shows the flow of the sort process. Furthermore, the online update difference data and the difference BM corresponding thereto shown in FIG. 10 correspond to generation (j).

In response to marker reception, the JNL sort program 217 (refer to FIG. 4) boots up. The JNL sort program 217 executes the sort process using the flow of processing shown in FIG. 10.

That is, the JNL sort program 217 references the bits of the difference BM (j) corresponding to the target P-VOL 187P sequentially from the start bit (Step 10001). If the referenced bit is ON (if this bit is indicated as having been updated), Step 10003 is carried out for this bit, and if the referenced bit is OFF (if this bit is indicated as not having been updated), the subsequent bit is referenced (Step 10002).

The JNL sort program 217 turns ON the bit in difference BM (j−1) that corresponds to the ON bit in difference BM (j) (Step 10003).

The JNL sort program 217 adds the data storage address corresponding to the bit that was turned ON in Step 10003 to the inside of JNCB (j−1) (Step 10004). This data storage address indicates the save-destination segment (the segment inside the JNL sub-area (j−1)) of Step 10005. This save-destination segment is the segment subsequent to the save-destination segment of the immediately previous time. Consequently, the respected data elements saved from the target S-VOL (j) are written to contiguous segments inside the JNL sub-area (j−1).

The JNL sort program 217 saves the data element "A" that is stored in the block (the block inside target S-VOL 187S) corresponding to the bit that is ON in difference BM (j−1) from this block to the above-mentioned save-destination segment (Step 10005).

The JNL sort program 217 writes data element "B", which is stored in the segment (the segment inside JNL sub-area (j)) indicating the data storage address corresponding to the ON bit in difference BM (j), to the save-source block (the block inside target S-VOL (j)) (Step 10006).

According to the above Steps 10005 and 10006, a COW resulting from the online update difference data element "B" being written to a block inside the target S-VOL (j), saves data element "A", which is stored in this block, to the segment inside JNL sub-area (j−1), and the online update difference data element "B" is written to the block inside the target S-VOL (j).

As described hereinabove, the bits configuring difference BM (j) are referenced in block address order, and each time an ON bit is detected, JNL data elements are sorted by Steps 10003 through 10006 being carried out. That is, the online update difference data elements, which had been chronologically contiguous in JNL sub-area (j), are reflected in the target S-VOL in block address order, thereby resulting in contiguous inter-generational difference data elements in block address order in JNL sub-area (j−1).

Furthermore, after the above sort processing has ended, all of the bits configuring the difference BM corresponding to the online update difference data are turned OFF (each time an online update difference data element is written to the S-VOL, the bit corresponding to this data element can be turned OFF).

Figure 11:
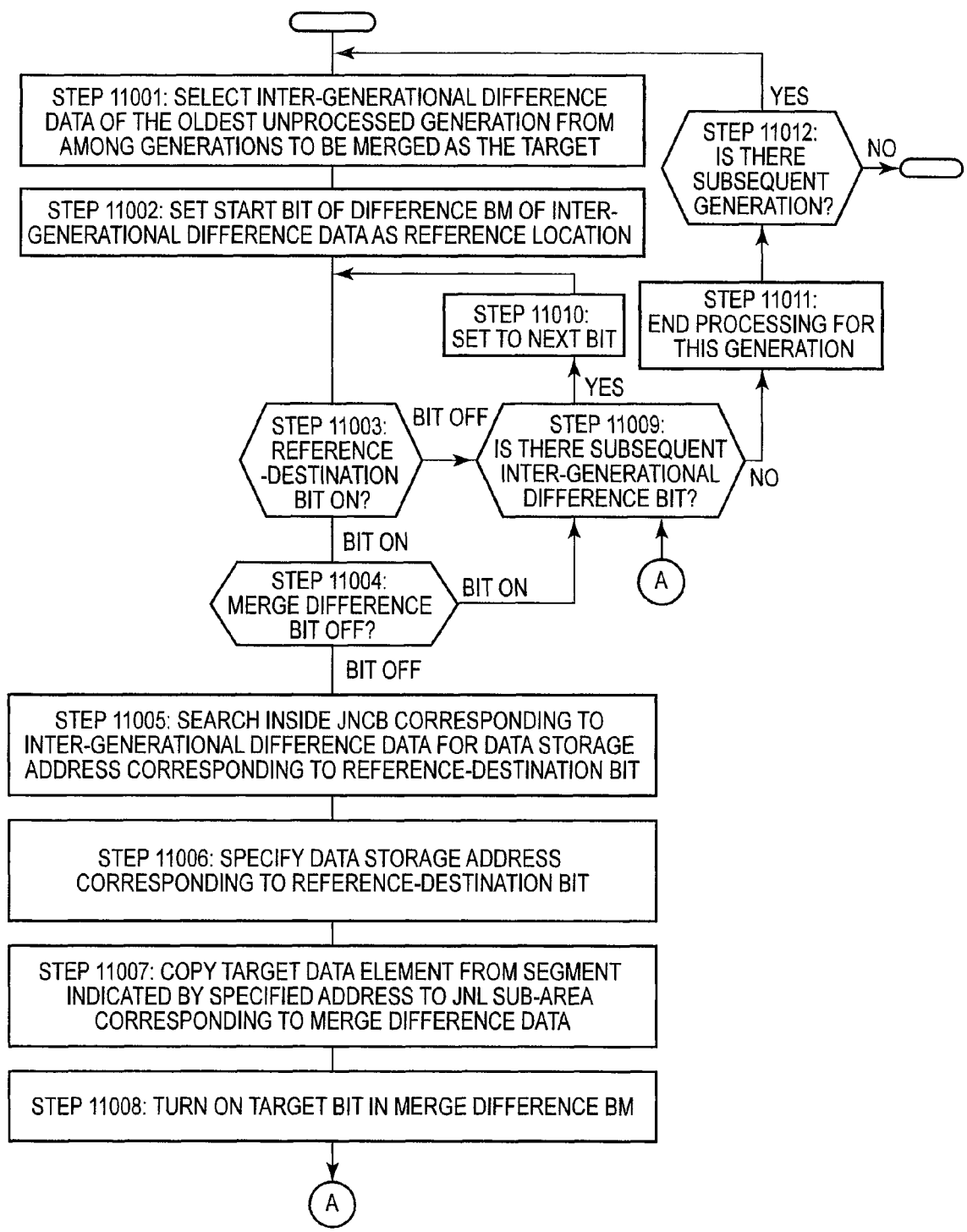
FIG. 11 is the flow of a merge process of the first embodiment.

FIG. 11 is the flow of merge processing for inter-generational difference data. FIG. 12 shows the movement of data elements related to this merge processing. Merge processing will be explained hereinbelow by referring to FIGS. 11 and 12.

Figure 12:
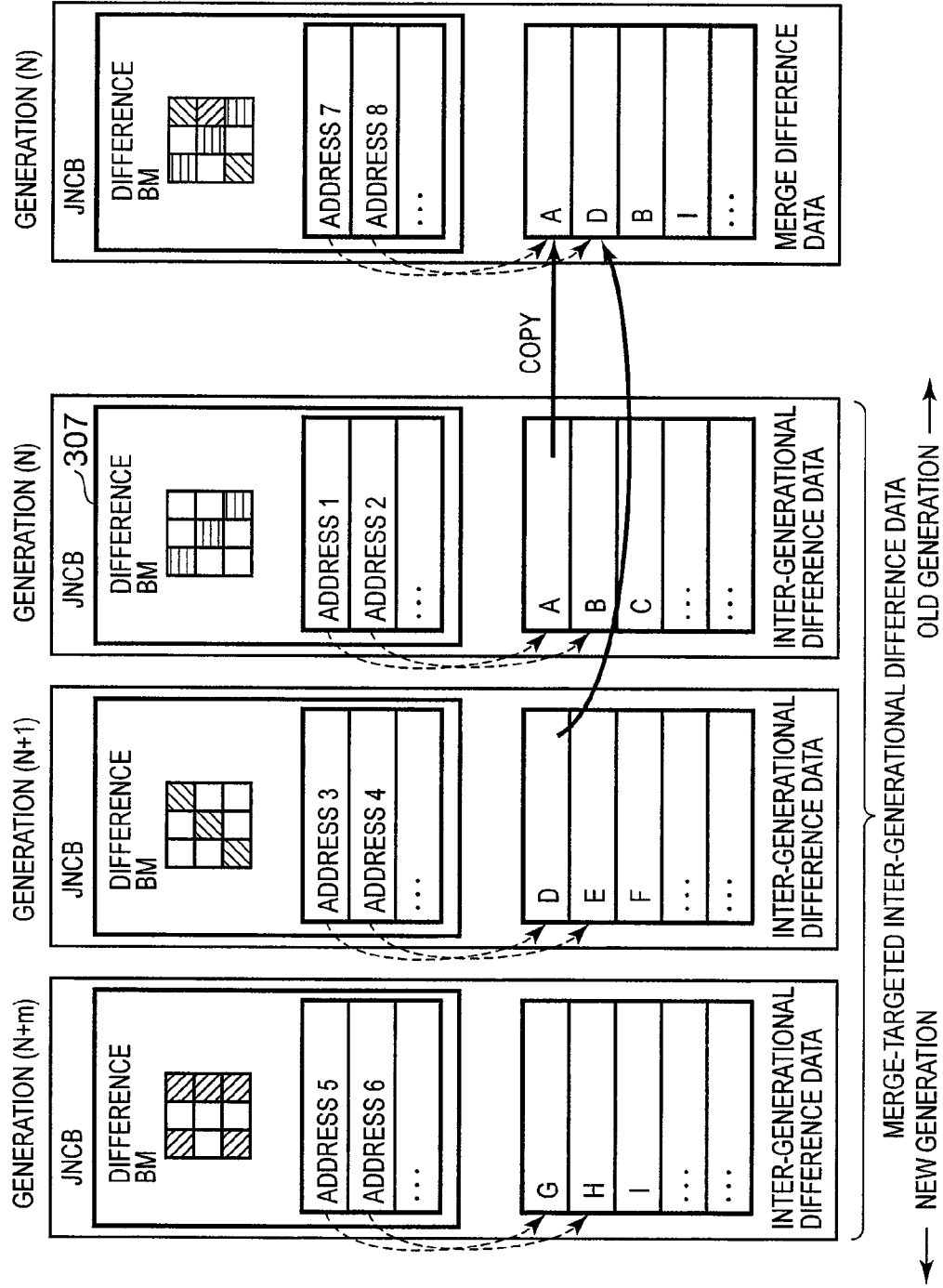
FIG. 12 shows the movement of data elements related to the merge process of the first embodiment.

As shown in FIG. 12, the JNL merge program 219 (refer to FIG. 4) commences merge processing, which converts (m+1) generations' worth of inter-generational difference data to merge difference data when the accumulation of a certain number of generations' worth of inter-generational difference data (for example, (m+1) generations (generation (N) through generation (N+m)) is detected. Furthermore, treating the detection of (m+1) generations' worth of inter-generational data as the trigger for commencing a merge process is only one example, and other triggers, for example, the passage of a prescribed period of time since the immediately previous merge process, are also possible.

The JNL merge program 219 sets the "status" of the merge-targeted generation (N) through generation (N+m) to "merging" in the backup generation management table 205. Then, the JNL merge program 219 selects as a target the inter-generational difference data of the oldest merge-targeted generation (N) (Step 11001).

The JNL merge program 219 decides the start bit of the difference BM (N) corresponding to the targeted inter-generational difference data as the reference location (Step 11002).

The JNL merge program 219 executes Step 11004 if the bit treated as the reference location for difference BM (N) is ON, and executes Step 11009 if this bit is OFF. In the explanations of FIGS. 11 and 12 below, the bit treated as this reference location will be referred to as the "target bit", and if this bit is ON, will be referred to as the "target ON bit", and if this bit is OFF, will be referred to as the "target OFF bit".

The JNL merge program 219 executes Step 11005 for the difference BM corresponding to recently created merge difference data (hereinafter referred to as the "merge difference BM" in the explanations of FIGS. 11 and 12) if the bit, which is in the same location as the above-mentioned target bit, is OFF, and executes Step 11009 if this bit is ON.

JNL merge program 219 searches for the data storage address corresponding to the target ON bit of the difference BM (N) (Step 11005), and specifies this address (Step 11006). Then, the JNL merge program 219 copies the inter-generational difference data element stored in the segment indicated by this address to the segment inside the JNL sub-area corresponding to the merge difference data to be created this time (the segment subsequent to the copy-destination segment of the immediately previous time) (Step 11007). Then, the JNL merge program 219 turns ON the bit that is in the same location as the above-mentioned target bit in the merge difference BM (Step 11008).

The JNL merge program 219 treats the subsequent bit as the reference location if there is a bit in the location subsequent of the reference location that has not been referenced yet in the difference BM (N) (Step 11009: YES), sets the subsequent bit as the reference location (Step 11010), and executes Step 11003. If there is no unreferenced bit in the subsequent location (Step 11009: NO), the processing for this generation (N) is ended (Step 11011), and if there is a subsequent generation (Step 11012: YES), Step 11001 is carried out for the subsequent generation (N+1). If there is no subsequent generation (that is, if the generation processed immediately prior is (N+m)) (Step 11012: NO), merge processing ends.

According to the flow of processing described hereinabove, as shown in FIG. 12, processing is first carried out from the inter-generational difference data corresponding to the oldest generation of the merge-targeted generations (N) through (N+m). If there is an ON bit in the difference BM corresponding to the inter-generational difference data, and the bit corresponding to this bit is OFF, the inter-generational difference data element corresponding to this ON bit is copied to the JNL sub-area corresponding to the merge difference data. Conversely, if there is an ON bit in the difference BM corresponding to the inter-generational difference data, and the bit corresponding to this ON bit is ON in the merge difference BM as well, the data element corresponding to the ON bit inside the difference BM corresponding to the inter-generational difference data is not copied.

In other words, the inter-generational difference data element corresponding to the older generation is preferentially copied to the JNL sub-area corresponding to the merge difference data. More specifically, for example, according to FIG. 12, inter-generational difference data elements "A" and "G", which correspond to the start blocks of the P-VOL, exist for two generations, generation (N) and generation (N+m). In this case, as described hereinabove, since the inter-generational difference data element corresponding to the older generation is given priority, the data element "A" of generation (N) is copied to the JNL sub-area corresponding to the merge difference data, but data element "G" of the generation that is newer than this generation (N) is not copied to this JNL sub-area.

Furthermore, in this merge process, processing starts from the old generation first, but processing can also start from a new generation first. However, in this case, if there is an ON bit in the difference BM corresponding to the inter-generational difference data, and the bit corresponding to this ON bit is ON in the merge difference BM as well, the data element that corresponds to the ON bit inside the difference BM corresponding to the inter-generational difference data can be overwritten by the merge difference data element corresponding to the ON bit, which is stored in the JNL sub-area corresponding to the merge difference data. Further, when the merge difference data is created, the plurality of generations' worth of inter-generational difference data that constitutes the basis of this merge difference data can be deleted either immediately after the end of merge difference data creation, or in response to an indication from a computer (for example, either the host computer 101 or the management server 111).

Further, inter-generational difference data and merge difference data can also be deleted from an old generation. In this case, for example, a JNL delete program not shown in the figure releases the JNCB and JNL data corresponding to the delete-targeted generation, and manages the deleted generation as a free area. Further, the JNL delete program deletes entries corresponding to the delete-targeted generation from the first JNL management table 207 and the backup generation management table 205.

Figure 13:
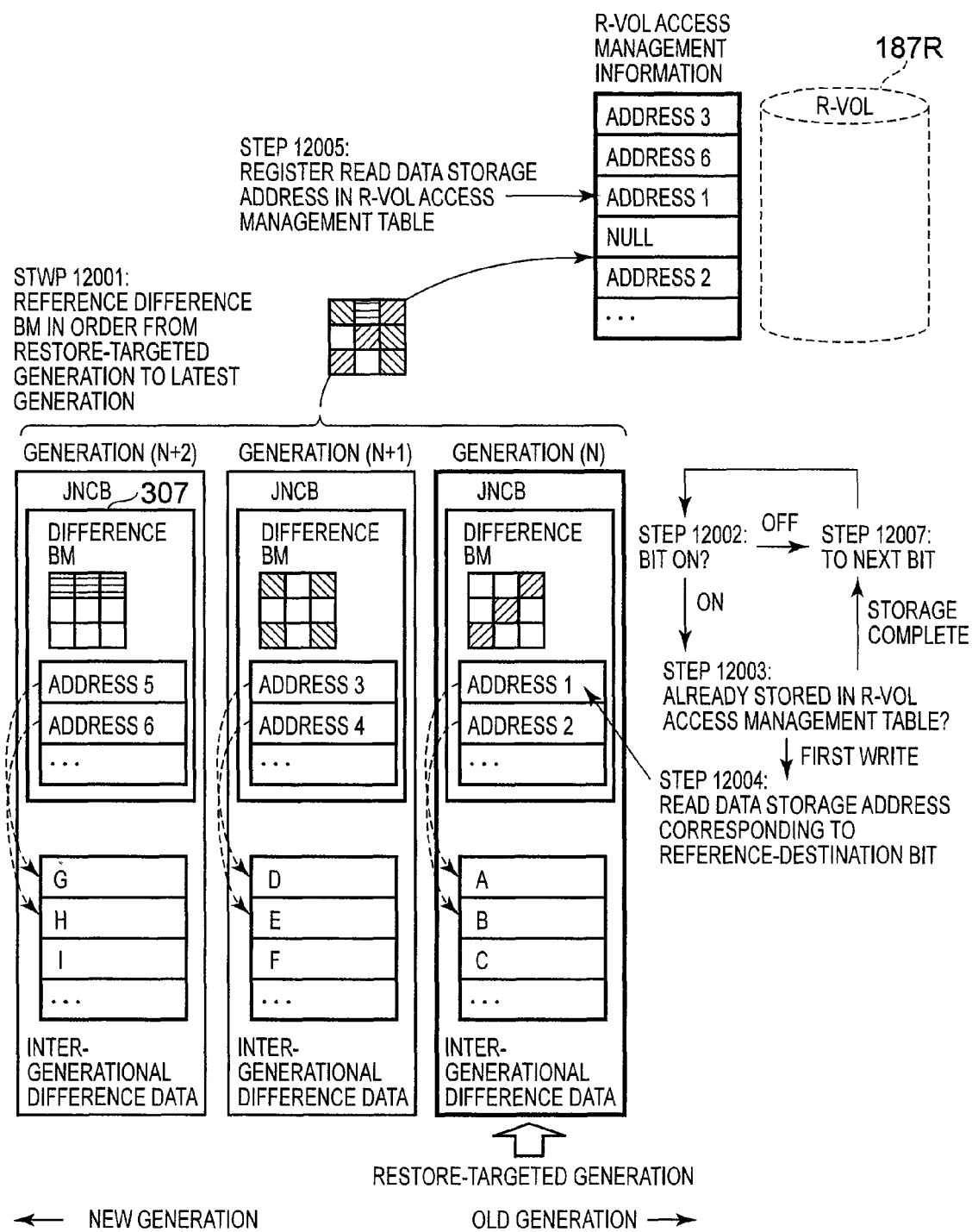
FIG. 13 shows the flow of a restore process.

FIG. 13 shows the flow of a restore process.

The restore program 221 (Refer to FIG. 4) receives a restore request having a restore-targeted generation specified by the user from either the host computer 101 or the management server 111. More specifically, for example, the restore program 221 sends the information of the backup generation management table 205 and so forth to either the host computer 101 or the management server 111 in response to a request from either the host computer 101 or the management server 111. The user references the "generation #", "backup acquisition time" and "user comment" in this table 205 and so forth, decides the restore-targeted generation, and specifies the decided restore-targeted generation to either the host computer 101 or the management server 111. The restore request having this specified restore-targeted generation (N) is sent to the restore program 221 from either the host computer 101 or the management server 111.

The restore program 221 executes the restore process in response to the restore request. In the restore process, the R-VOL access management table 209 is created. The R-VOL access management table 209 is configured from a plurality of address records. The respective address records correspond to the respective blocks (virtual blocks) that configure the R-VOL, and as such, correspond to the respective bits in the difference BM.

The restore program 221 sequentially references the difference BM of the inter-generational difference data (or the merge difference data) from the restore-targeted generation (N) to the new generations (N+1), (N+2) (Step 12001). A case in which the reference-destination difference BM is the restore-targeted generation (N) will be given as an example and explained hereinbelow.

The restore program 221 carries out ON-OFF determinations from the start bit of the difference BM (N) (Step 12002). When the referenced bit is ON, the restore program 221 references the address record corresponding to this ON bit (Step 12003). If an invalid address (for example, Null) is in this record, the restore program 221 reads out the data storage address corresponding to the referenced ON bit from inside JNCB (N) (Step 12004), and registers this record (Step 12005), and conversely, if a valid address has been registered in this record, references the subsequent bit (Step 12006).

The R-VOL access management table 209 is completed by carrying out the above Steps 12002 through 12006 for not only the restore-targeted generation (N), but also for the newer generations (N+1) and (N+2). That is, for example, in Step 12006, if there is no subsequent bit to serve as the reference destination, Steps 12002 through 12006 are carried out for the generation (N+1) subsequent to the restore-targeted generation (N).

When the R-VOL access management table 209 is created as described hereinabove, a read process (and write process) to the R-VOL is possible. In this case, the "status" corresponding to the R-VOL in the configuration management table 201 becomes "normal" (that is, R/W enabled) (prior to this, this "status" is "R/W disabled").

Incidentally, instead of creating an R-VOL access management table 209, an R-VOL can be provided as a real VOL. In this case, for example, the data storage address is specified using the same method as the method for creating the R-VOL access management table 209, and the data element can be copied from the segment indicated by the specified address to the block that corresponds to the bit to which this address corresponds inside the R-VOL (real VOL).

Figure 14:
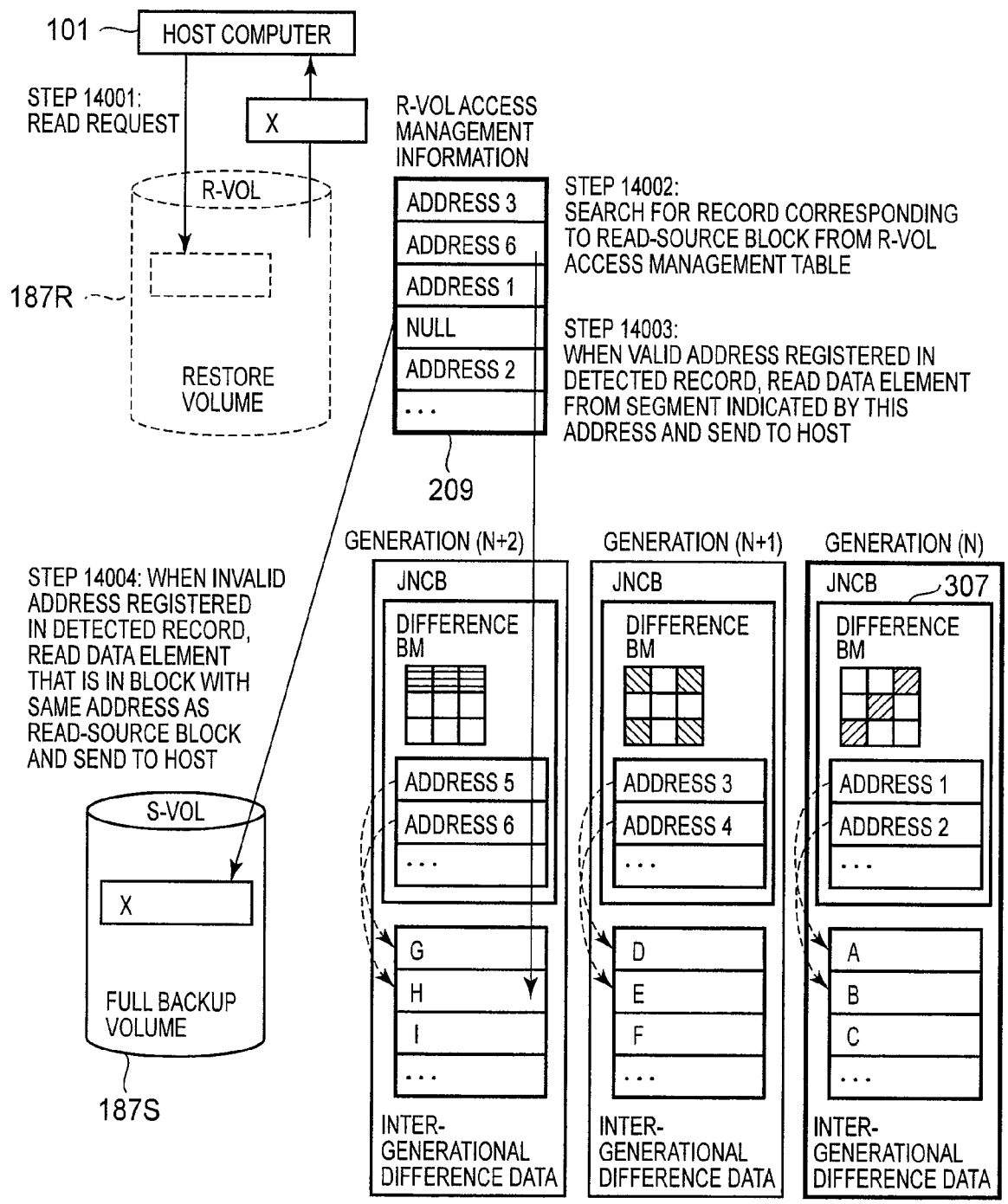
FIG. 14 shows the flow of a read process that uses an R-VOL management table.

FIG. 14 shows the flow of a read process that uses the R-VOL access management table 209.

The R/W program 213 (refer to FIG. 4) receives from the host computer 101 a read command that specifies the R-VOL 187R shown in FIG. 13 (Step 14001).

The R/W program 213 references the record (the record inside the R-VOL access management table 209) corresponding to the read-source block specified by this read command (Step 14002).

If the result of Step 14002 is that a valid address is registered in the reference-destination record, the R/W program 213 reads out the data element from the segment indicated by this address, and sends this data element to the host computer 101 (Step 14003).

Conversely, if the result of Step 14003 is that an invalid address is registered in the reference-destination record, the R/W program 213 reads out the data element from the block that has the same address as the above-mentioned read-source block inside the S-VOL (full backup volume) corresponding to the R-VOL, and sends this data element to the host computer 101 (Step 14004).

Figure 15:
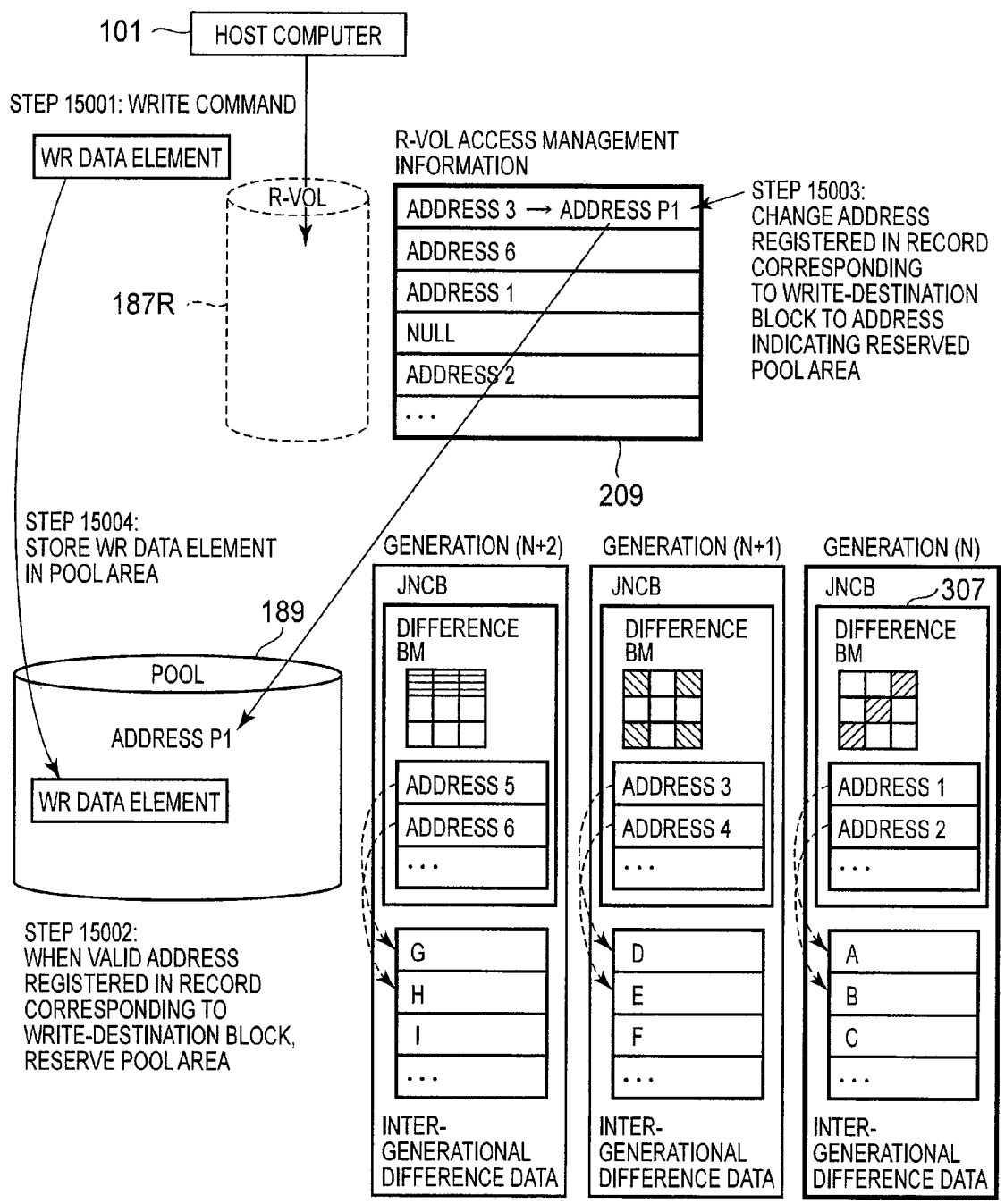
FIG. 15 shows the flow of a write process that uses an R-VOL management table.

FIG. 15 shows the flow of a write process that uses the R-VOL management table 209.

The R/W program 213 receives from the host computer 101 a write command that specifies the R-VOL 187R shown in FIG. 13 (Step 15001). The R/W program 213 references the record (the record inside the R-VOL access management table 209) corresponding to the write-destination block specified in this write command.

If the valid address "address 3" is registered in the reference-destination record, the R/W program 213 reserves an area the size of the host write size from either storage pool 189A or 189B (Step 15002), and changes the above-mentioned valid address "address 3" to "address P1", the address indicating this reserved area (Step 15003). Then, the R/W program 213 writes the write data element to this reserved area (Step 15004).

Furthermore, if an invalid address is registered in the reference-destination record, this invalid address is changed to the address indicating the reserved area inside either storage pool 189A or 189B.

Figure 20:
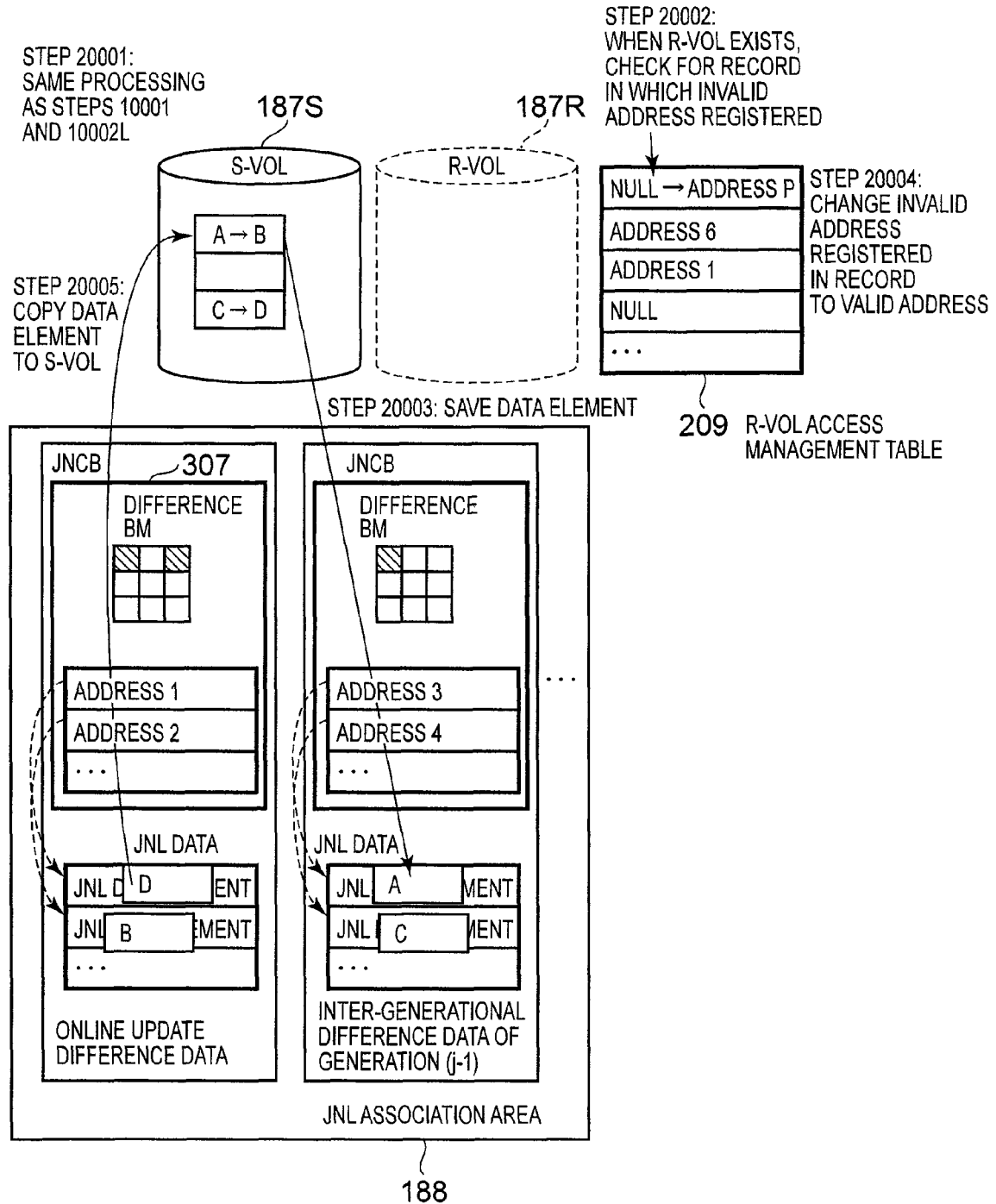
FIG. 20 shows the flow of a sort process in which there is a R-VOL.

FIG. 20 shows the flow of sort processing when there is an R-VOL.

Copying online update difference data to the S-VOL when a marker is received saves the data element that was stored in the S-VOL. Thus, when a marker is received in a state in which there is an R-VOL, there is the danger of the corresponding relationships between the respective addresses and the respective data elements stored in the R-VOL access management table changing. More specifically, for example, due to the fact that an invalid address is registered in the reference-destination record of the R-VOL access management table, a read of the data element stored in the block (a block inside the S-VOL) corresponding to this reference-destination record can be expected, but if the online update difference data element is copied to this block as a result of the above-mentioned marker reception, this data element will be saved to the JNL sub-area, making it impossible to acquire the expected data element from the S-VOL.

For this reason, the processing to be explained by referring to FIG. 20 is carried out.

First, Steps 10001 through 10002 are carried out (Step 20001).

Next, the JNL sort program 217 determines whether or not the corresponding S-VOL will be accessed when the R-VOL is accessed (Step 20002). More specifically, the JNL sort program 217 determines whether or not an invalid address is registered in the R-VOL access management table 209.

If the result of this determination is that an invalid address is discovered, the JNL sort program 217 specifies the block corresponding to the record in which the invalid address is registered, and references "address 3", which is the data element address (the data storage address corresponding to the bit inside difference BM (j−1)) corresponding to the specified block. Then, the JNL sort program 217 saves data element "A", which is stored in the block (the block inside the S-VOL) corresponding to the record in which this invalid address is registered, to the segment indicated by this address "address 3" (Step 20003). The JNL sort program 217 changes the invalid address "Null" to the address "address P1" indicating the save-destination segment of data element "A" in the R-VOL access management table 209 (Step 20004). Then, the JNL sort program 217 writes online update difference data element "B", which corresponds to this block, to the save-source block (Step 20005).

In accordance with the processing described hereinabove, a sort process that maintains the corresponding relationships between the respective blocks and the respective data elements inside the R-VOL can be carried out even when a marker is received when there is an R-VOL.

Embodiment 2

A second embodiment of the present invention will be explained hereinbelow. In so doing, explanations of the points in common with the first embodiment will be omitted or simplified, and the points of difference with the first embodiment will mainly be explained (Furthermore, this approach is not limited to the second embodiment, but rather will be the same for the third and subsequent embodiments as well).

In the second embodiment, the online update difference data element is a before JNL data element of the P-VOL.

Figure 16:
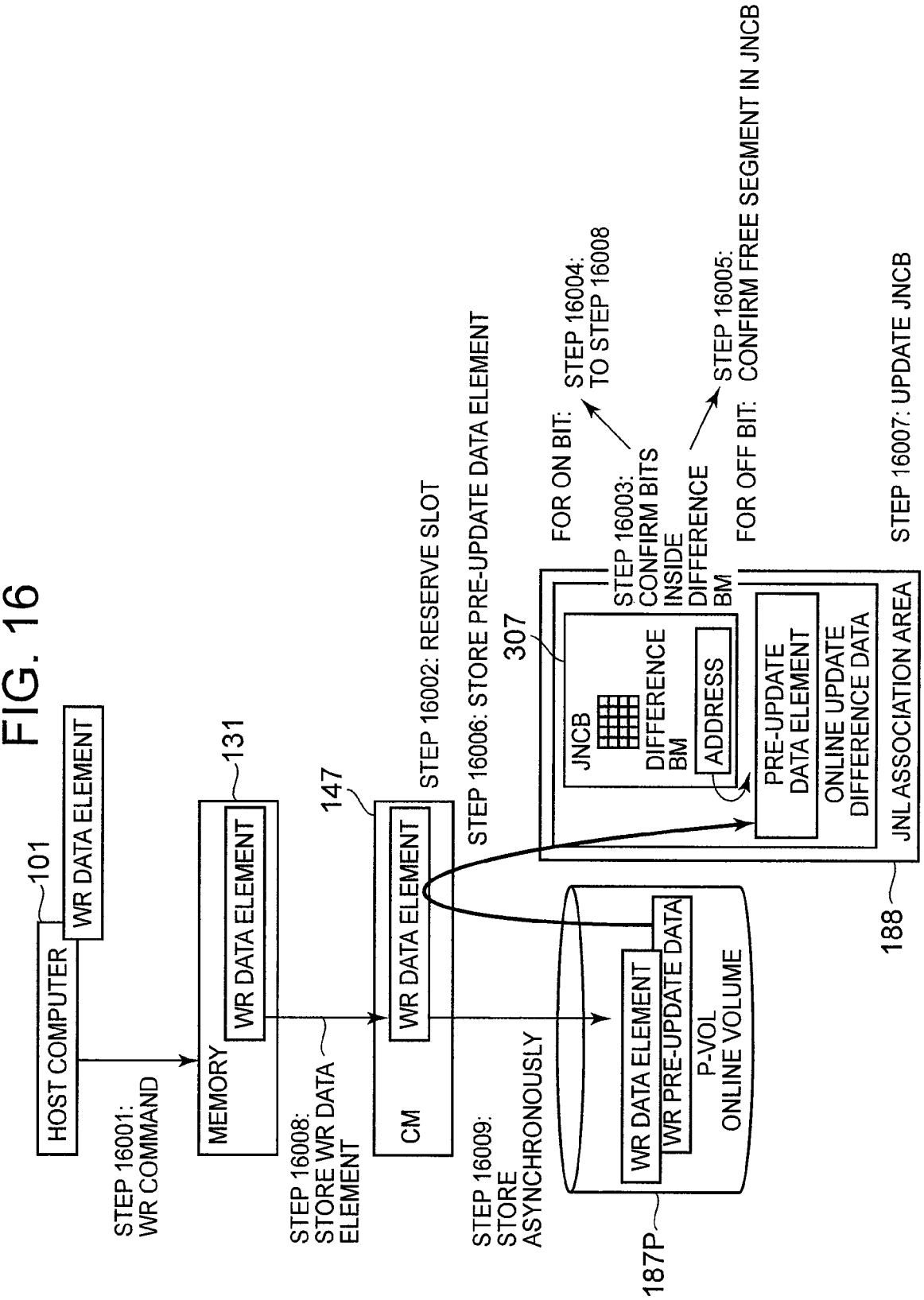
FIG. 16 shows the flow of a write process for writing a write data element to a P-VOL in a second embodiment of the present invention.

FIG. 16 shows the flow of write processing that writes a write data element to the P-VOL of the second embodiment.

The R/W program 213, upon receiving a write command from the host computer 101 (Step 16001), reserves a slot for storing the write data element (Step 16002). In addition, the R/W program 213 references the bit corresponding to the write-destination block, which was specified by the write command, inside the difference BM corresponding to the online update difference data (Step 16003).

When the result of Step 16003 is that the reference destination is the ON bit, the R/W program 213 executes Step 16008 and beyond (Step 16004). That is, the data element stored in the write-destination block is not saved to the JNL sub-area as the online update difference data element.

Conversely, when the result of Step 16003 is that the reference destination is the OFF bit, the R/W program 213 references the JNL area management table 203 corresponding to the target P-VOL (the P-VOL specified by the write command) 187P, thereby specifying the free segment inside the JNL sub-area corresponding to the online update difference data for the target P-VOL 187P (Step 16005). Furthermore, if there is no free segment, it is possible to reserve a new JNL sub-area.

Subsequent to Step 16005, the R/W program 213 saves the data element stored in the write-destination block to the above-mentioned specified free segment (Step 16006). Then, the R/W program 213 updates the JNCB corresponding to the online update difference data (Step 16007). More specifically, the R/W program 213 turns ON the bit (the OFF bit of the above-mentioned reference destination inside the difference BM) corresponding to the write-destination block, and adds the address indicating the above-mentioned free segment as the data storage address corresponding to this write-destination block.

Thereafter, the R/W program 213 writes the write data element stored in the memory 131 inside the front-end interface 127 to the slot reserved in Step 16002 (Step 16008).

The R/W program 213 writes the write data element written to this slot to the write-destination block inside the P-VOL (Step 16009).

Figure 17:
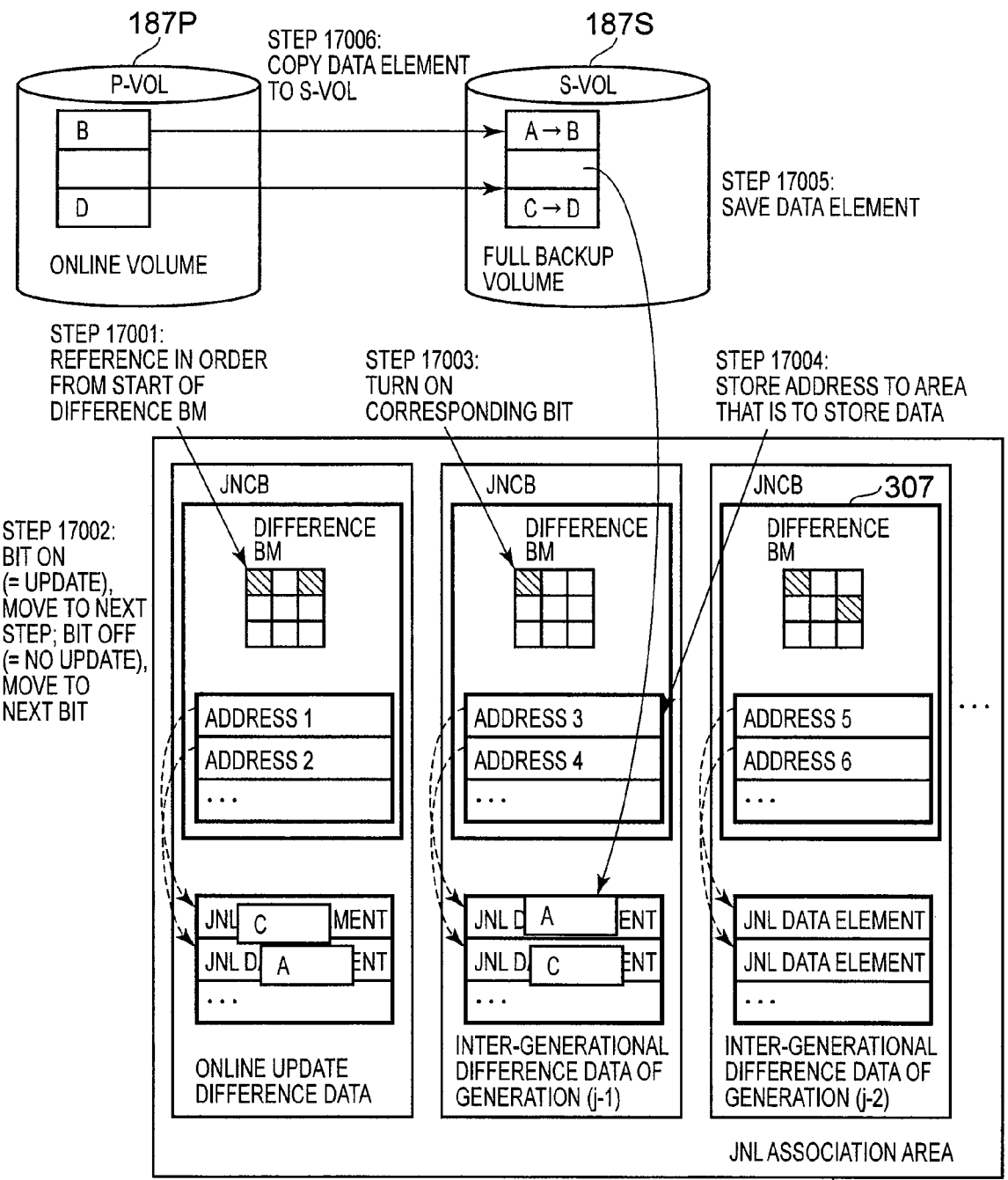
FIG. 17 shows the flow of a sort process of the second embodiment.

FIG. 17 shows the flow of sort processing in the second embodiment.

The same processing as Steps 10001 through 10005 is carried out (Steps 17001 through 17005).

Thereafter, the JNL sort program 217 copies the data elements, which correspond to the respective ON bits inside the difference BM corresponding to the online update difference data, from the respective blocks inside the P-VOL to the respective blocks of the same addresses inside the S-VOL (Step 17006).

Embodiment 3

In a third embodiment, online update difference data is not stored. Thus, this third embodiment differs from the first and/or second embodiments in the following aspects.

Figure 18:
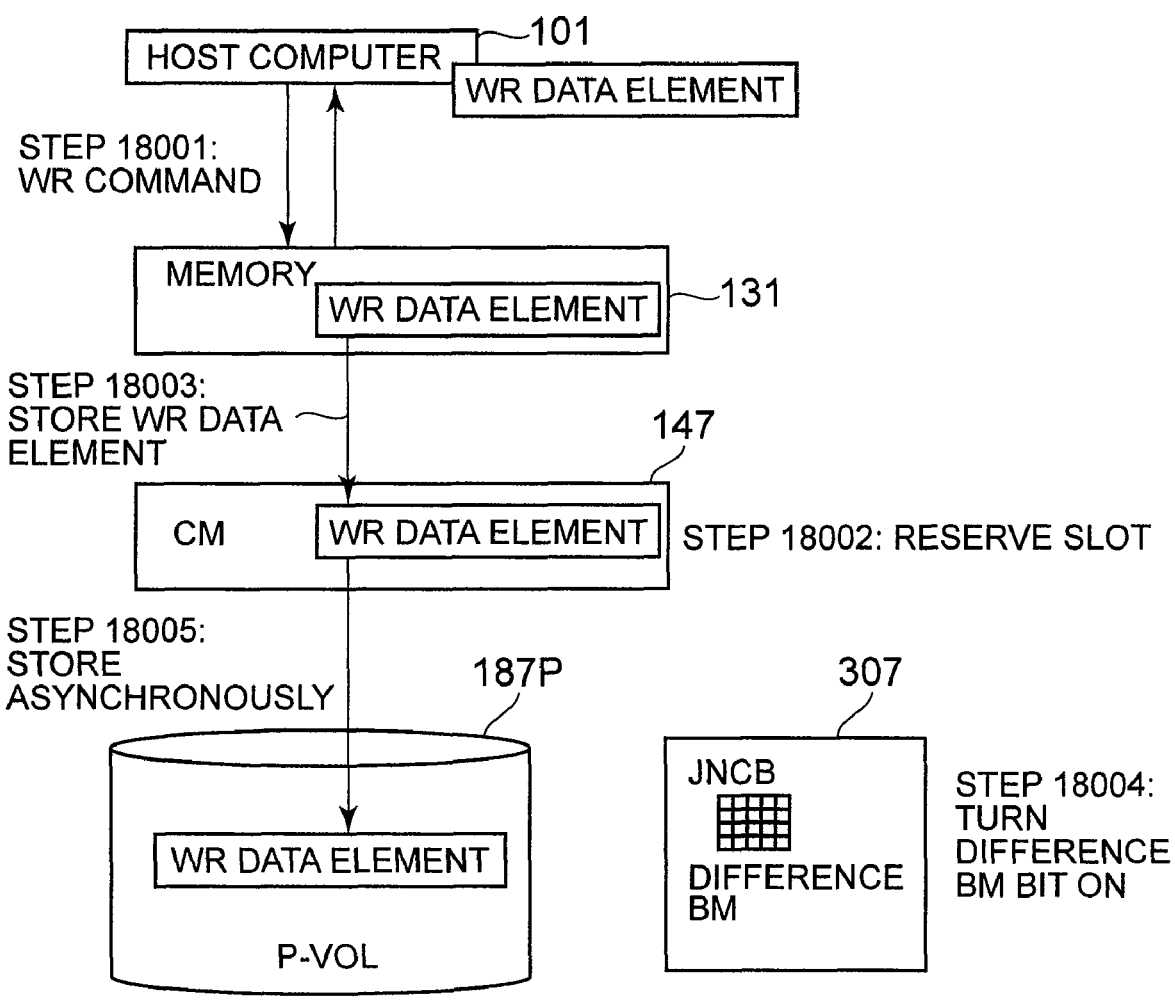
FIG. 18 shows the flow of a write process for writing a write data element to a P-VOL in a third embodiment of the present invention.

For example, as shown in Steps 18001 through 18005 of FIG. 18, a JNL data element for the P-VOL is not stored in the JNL area in a write process to the P-VOL.

Figure 19:
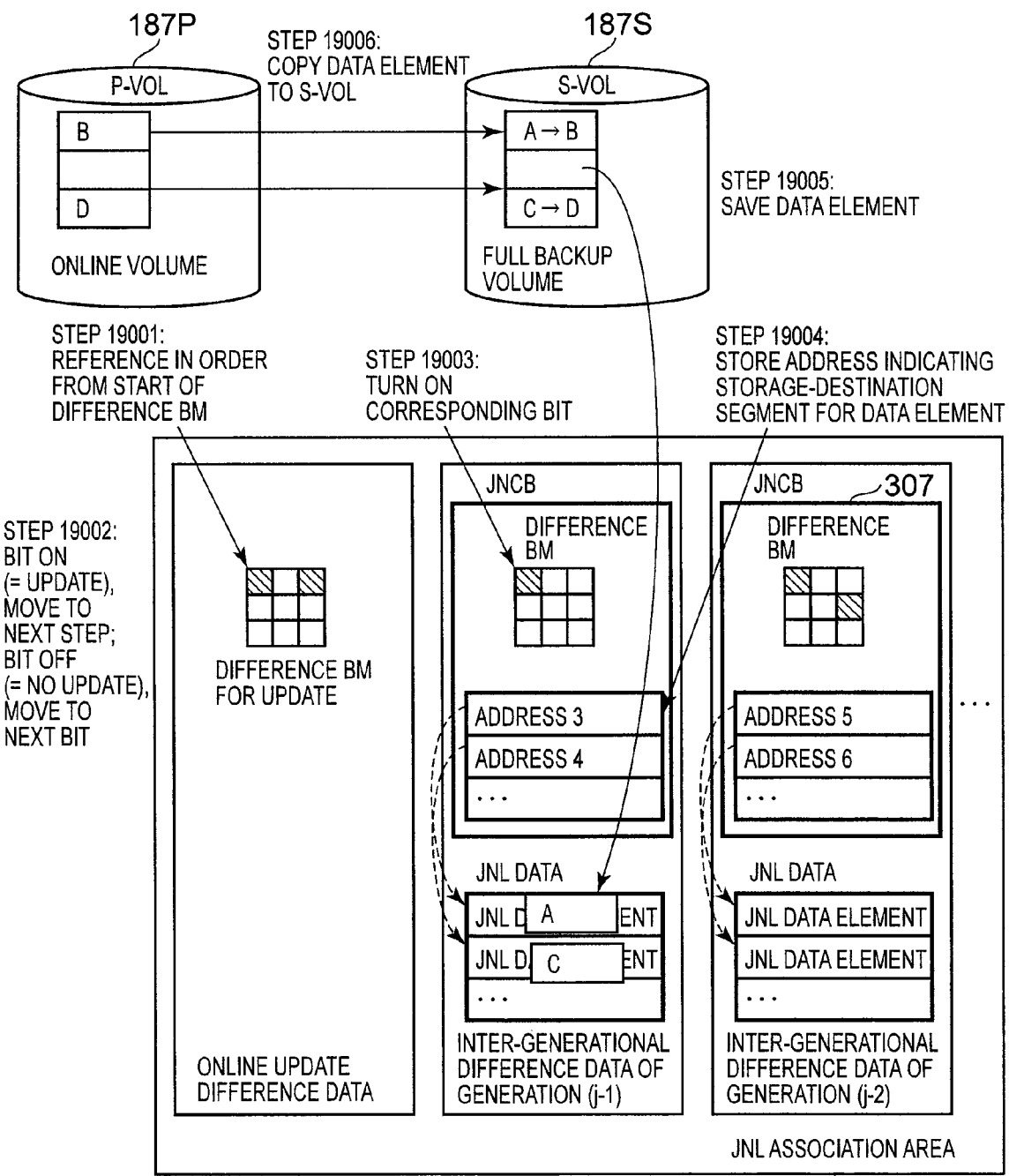
FIG. 19 shows the flow of a sort process of the third embodiment.

Further, for example, in the sort process, the same sort processing as that of FIG. 17 is carried out as shown in FIG. 19. That is, Steps 19001 through 19006 of FIG. 19 are the same as the respective Steps 17001 through 17006 of FIG. 17.

Figure 21:
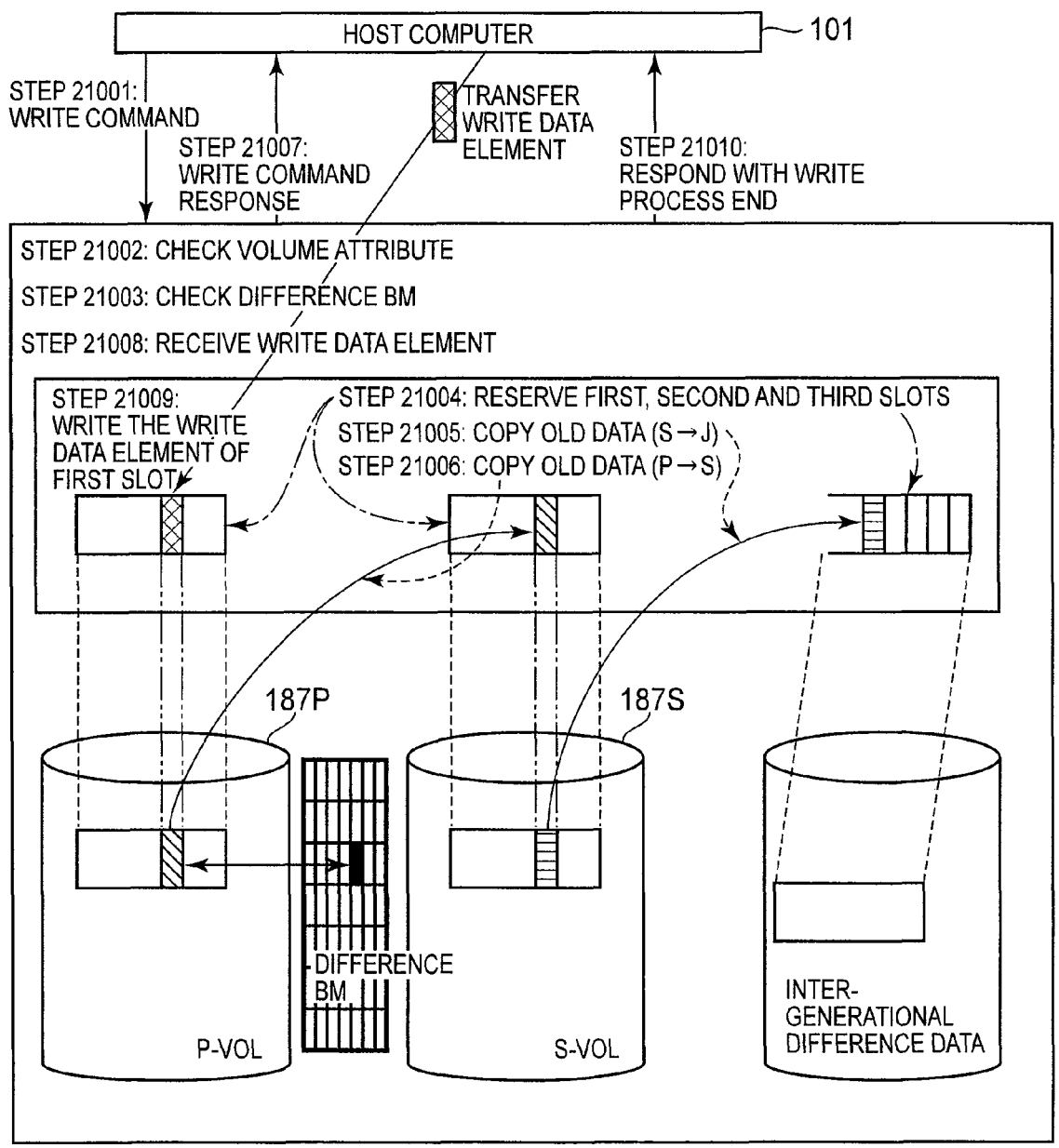
FIG. 21 shows a P-VOL write process immediately subsequent to marker reception in the second and third embodiments.

FIG. 21 shows a P-VOL write process immediately after marker reception in the third embodiment (and the second embodiment). In the following explanation, the timing at which the part of the data elements yet to be saved from among all the data elements to be saved from the S-VOL is considered.

The R/W program 213, upon receipt of a write command (Step 21001), checks the volume attribute of the VOL specified by the write command (Step 21002). If it is determined that this VOL is the P-VOL, the R/W program 213 references the bit corresponding to the write-destination block inside the latest difference BM for this P-VOL (Step 21003).

If this bit is ON as shown in FIG. 21, the data element stored in the write-destination block must be copied to the S-VOL before this data element is overwritten by the write data element. Thus, the R/W program 213 reserves a first slot that corresponds to the write data element, reserves a second slot that corresponds to the data element to be saved from the P-VOL, and reserves a third slot that corresponds to the data element to be saved from the S-VOL (Step 21004).

Thereafter, the R/W program 213 saves the data element from the block (block inside the S-VOL) of the same address as the write-destination block to the JNL sub-area by way of the third slot (Step 21005). Further, the R/W program 213 saves the data element from the write-destination block to the block (block inside the S-VOL) of the same address as the write-destination block by way of the second slot (Step 21006).

The R/W program 213 sends a response corresponding to the write command to the host computer 101 (Step 21007), receives the write data element from the host computer 101 in response thereto (Step 21008), and writes the received write data element to the first slot (Step 21009). The write data element, which was written to the first slot, is written to the write-destination block inside the P-VOL.

Furthermore, in the explanation up to this point, as a rule, if the acquired first JNL data element (for example, the online update difference data element) was corresponding to the same block as the second JNL data element that exists in the JNL sub-area, the second JNL data element has been overwritten by the first JNL data element in the JNL sub-area, and as such, the maximum size of the JNL data (for example, the online update difference data) has been treated as the same size as the P-VOL or S-VOL. However, the present invention is not limited to this, and the acquired JNL data element can also be stored in the JNL sub-area without being overwritten. In this case, the online update difference data, inter-generational difference data, and merge difference data can all exceed the size of the P-VOL and S-VOL.

Embodiment 4

Figure 22:
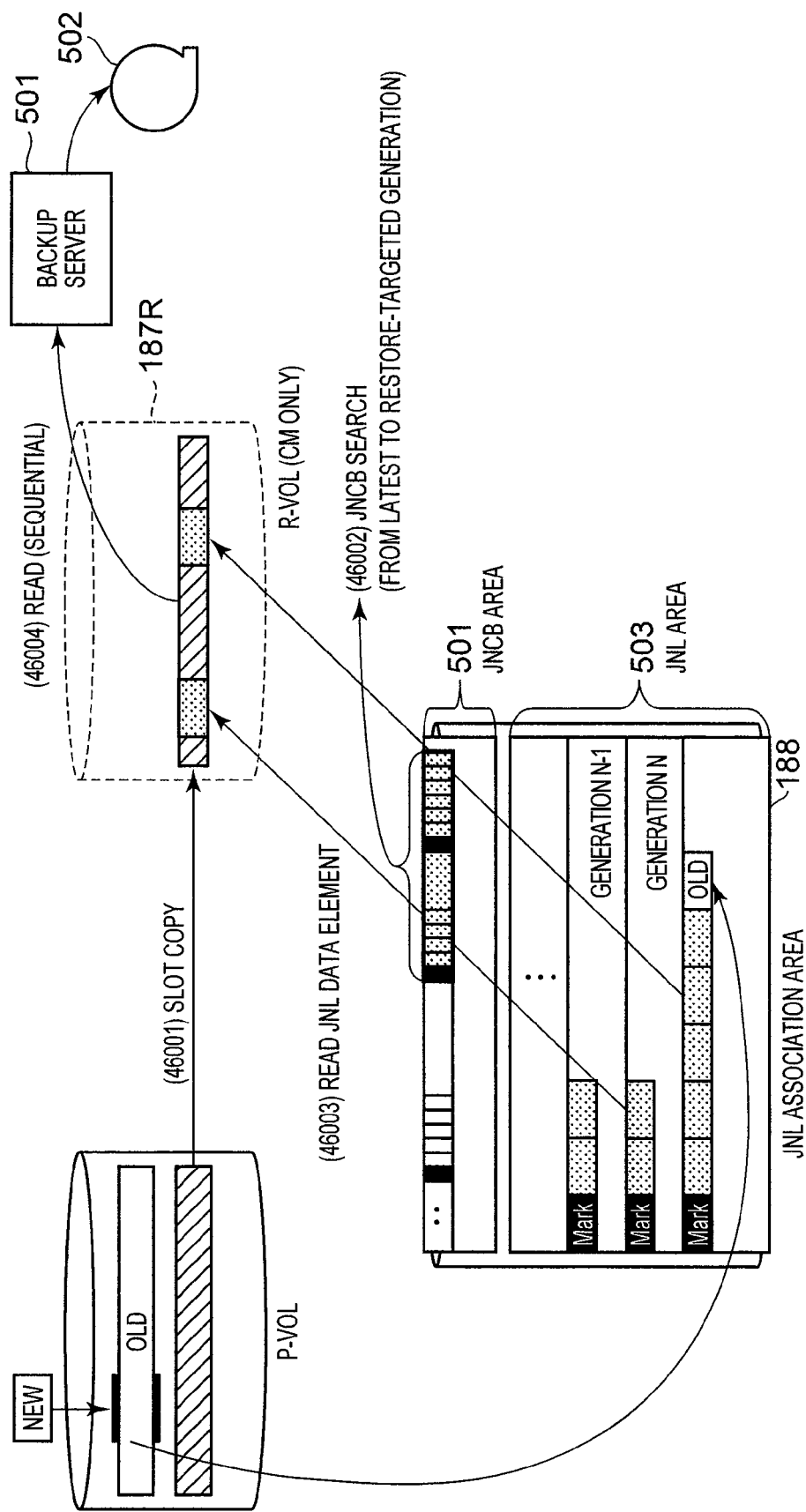
FIG. 22 shows an overview of a restore process of a forth embodiment of the present invention.
Figure 23:
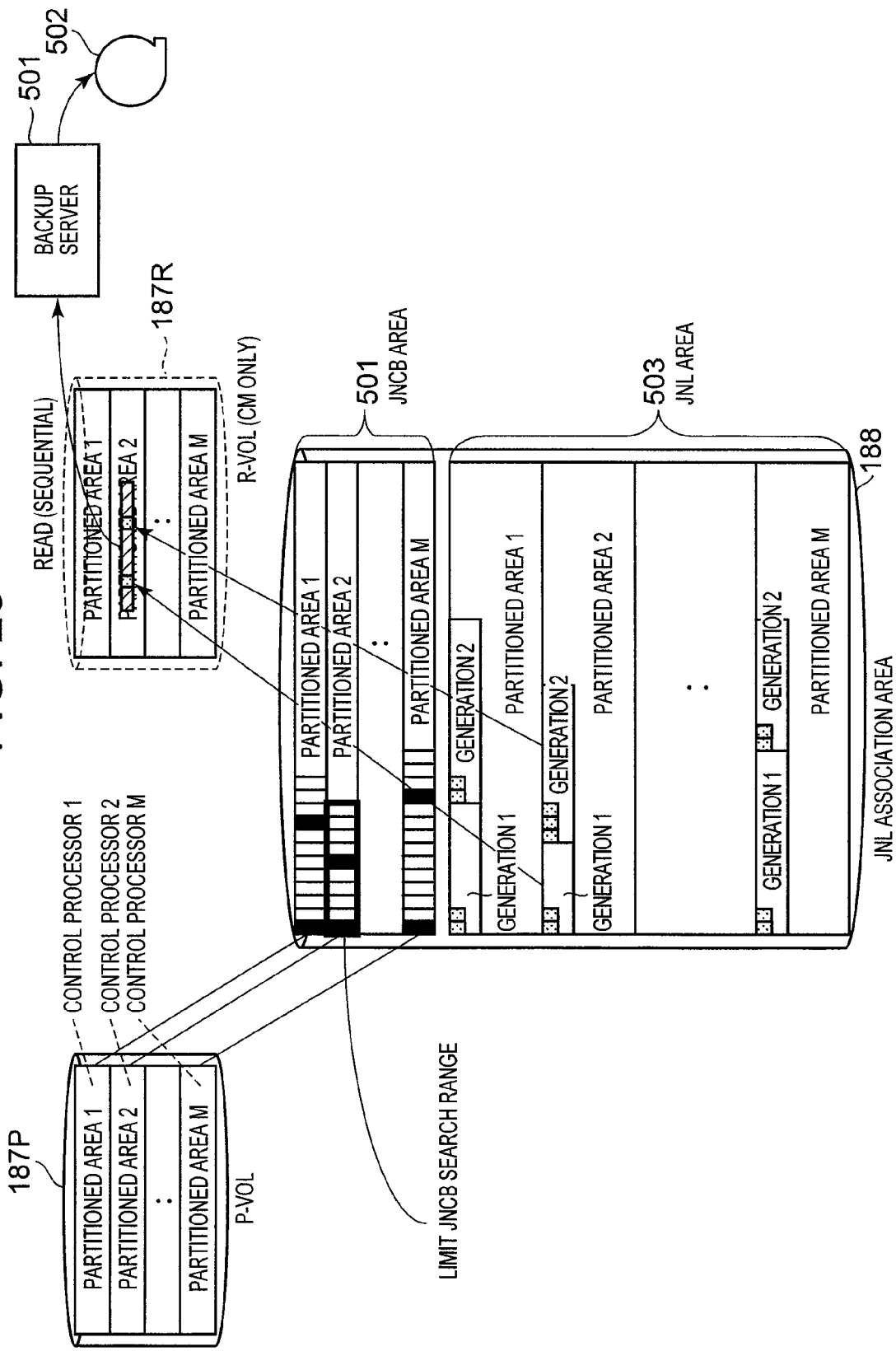
FIG. 23 shows examples of the configurations of a P-VOL, R-VOL, and JNL association area of the forth embodiment.
Figure 24:
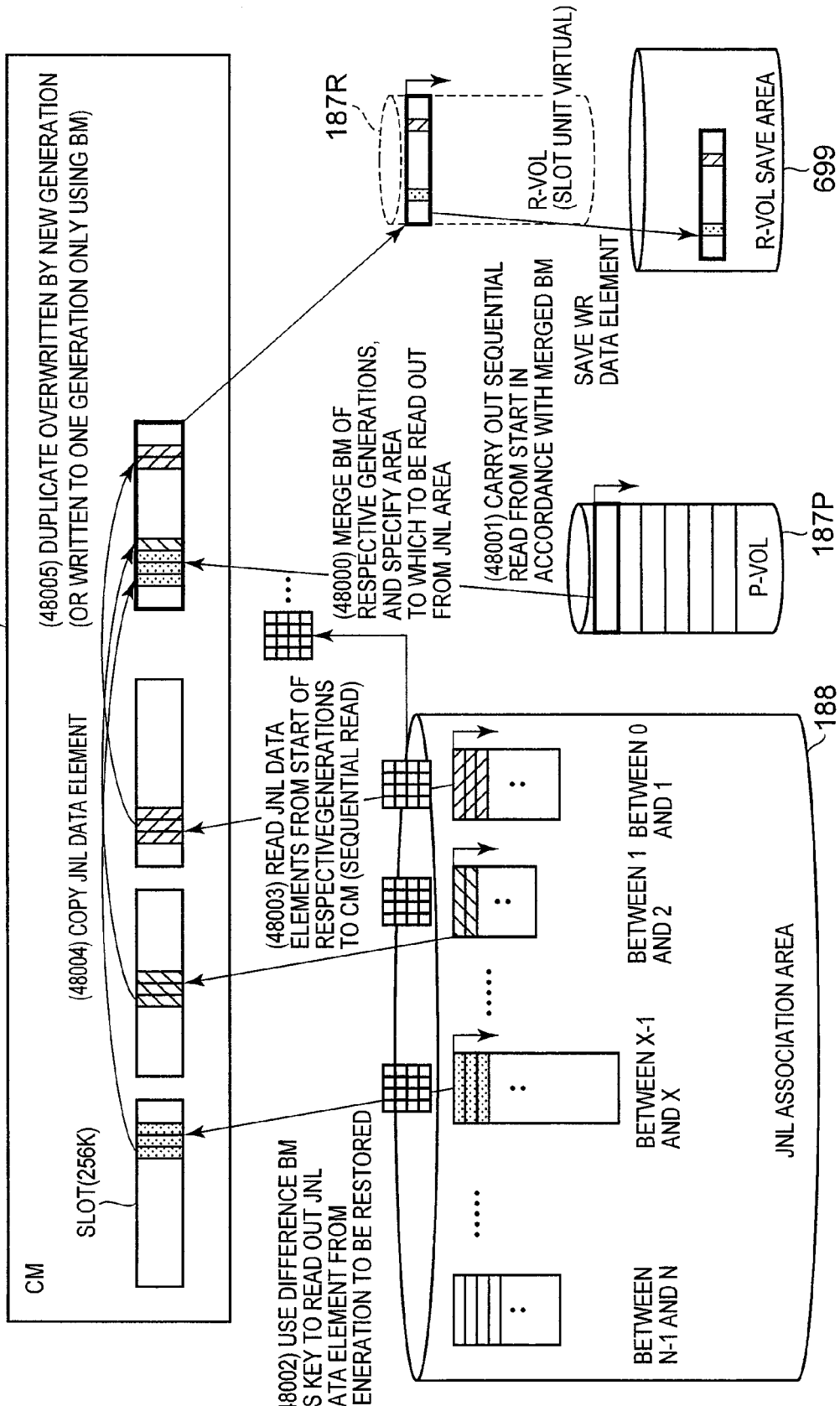
FIG. 24 shows how to use the cache memory in the forth embodiment.

FIG. 22 shows an overview of a restore process in a forth embodiment of the present invention. FIG. 23 shows examples of the configurations of the P-VOL, R-VOL and JNL association area in this embodiment. FIG. 24 shows how to use the cache memory 147 in this restore process. Furthermore, the explanation that references FIGS. 46 through 48, the JNL data element is the before JNL data element. Further, generation (N) is the restore-targeted generation.

In this embodiment, as shown in FIGS. 46 and 47, data is read out to the backup server 501 from the R-VOL 187R, and this data is written to a storage apparatus (for example, a tape library) 502 that is connected to the backup server 501. The data, for example, is read out sequentially from the R-VOL start address, and written sequentially to the storage apparatus 502.

As shown in FIG. 22, the restore program 221 reads out data from the respective slot size areas inside the P-VOL (or S-VOL) to the cache memory 147 (Reference Numeral 46001). The slot size, for example, is larger than the host write size. Therefore, the slot size area, for example, is configured from a plurality of blocks.

Next, the restore program 221, based on the JNCB from the restore-targeted generation (N) to the latest generation (Reference Numeral 46002), reads out the inter-generational difference data element that is in the restore-targeted generation (N) of the P-VOL from the JNL area, and overwrites this inter-generational difference data element in the location that accords with the data storage address inside the JNCB of the slot size data inside the cache memory 147 (Reference Numeral 46003). By so doing, subsequent to a certain slot size worth of data that corresponds to generation (N) having been defined inside the cache memory 147, the defined slot size worth of data inside the cache memory 147 is transferred to the backup server 501.

As shown in FIG. 23, in this embodiment, the P-VOL (and/or the S-VOL), the R-VOL (substantially the cache memory), the JNCB area and the JNL area are partitioned into a plurality of sub-areas. Hereinafter, this sub-area will be referred to as the "partitioned area", and will be explained by assigning a serial number p (where p is a natural number) to each partitioned area. The respective partitioned areas p inside the P-VOL, R-VOL, JNCB area and JNL area correspond to one another. Further, for example, the JNCB corresponding to one generation is partitioned and stored in a plurality of partitioned areas 1 through M in the JNCB area, and similarly, the JNL data corresponding to one generation (for example, the inter-generational difference data) is also partitioned and stored in a plurality of partitioned area 1 through M in the JNL area.

In this embodiment, there is a plurality of control processors 143, and individual control processors 143 are allocated to each of either one or two or more partitioned areas. The respective control processors 143 each execute the processing explained by referring to FIG. 22 for the partitioned area under its charge. The plurality of control processors 143 parallelly execute the processing explained by referring to FIG. 22.

For example, the following processing is carried out for a single partitioned area.

That is, as shown in FIG. 24, the control processor 143 in charge of this partitioned area reserves a plurality of slots that correspond to from generation (N) to the latest generation, and reserves a slot that corresponds to the R-VOL for the partitioned area in the cache memory 147.

Next, the control processor 143 merges the difference BM part from generation (N) to the latest generation (the difference BM part corresponding to the partitioned area) (Reference Numeral 48000), and reads out a slot size amount of data comprising the data elements corresponding to the ON bits in the merged difference BM part to the slot corresponding to from the P-VOL 187P (or S-VOL) to the R-VOL (Reference Numeral 48001). In so doing, the respective data elements are stored in locations based on the data storage addresses inside the JNCB.

Next, the control processor 143 reads out the data element (N) corresponding to the ON bit in the difference BM part that corresponds to generation (N) to slot (N) (Reference numeral 48002). The control processor 143 carries out the same processing for the respective generations that are newer than generation (N) (Reference Numeral 48003).

The control processor 143 copies the data elements inside the slots from generation (N) to the latest generation to the slots corresponding to the R-VOL (Reference Numeral 48004). When a data element exists in the copy destination at this time, this data element is overwritten by a data element corresponding to a newer generation (Reference Numeral 48005). When a copy like this from generation (N) to the latest generation has ended, the data of the slot size corresponding to generation (N) is defined.

Furthermore, when a slot cannot be reserved in the cache memory 147, the control processor 143 saves the data of the defined slot size in the cache memory 147 to the save area of the R-VOL (for example, one part of the storage pool (for example, the pool VOL)) 699. Or, for example, upon receipt of a write data element for the R-VOL, the control processor 143 saves this write data element to the R-VOL save area 699.

Figure 25:
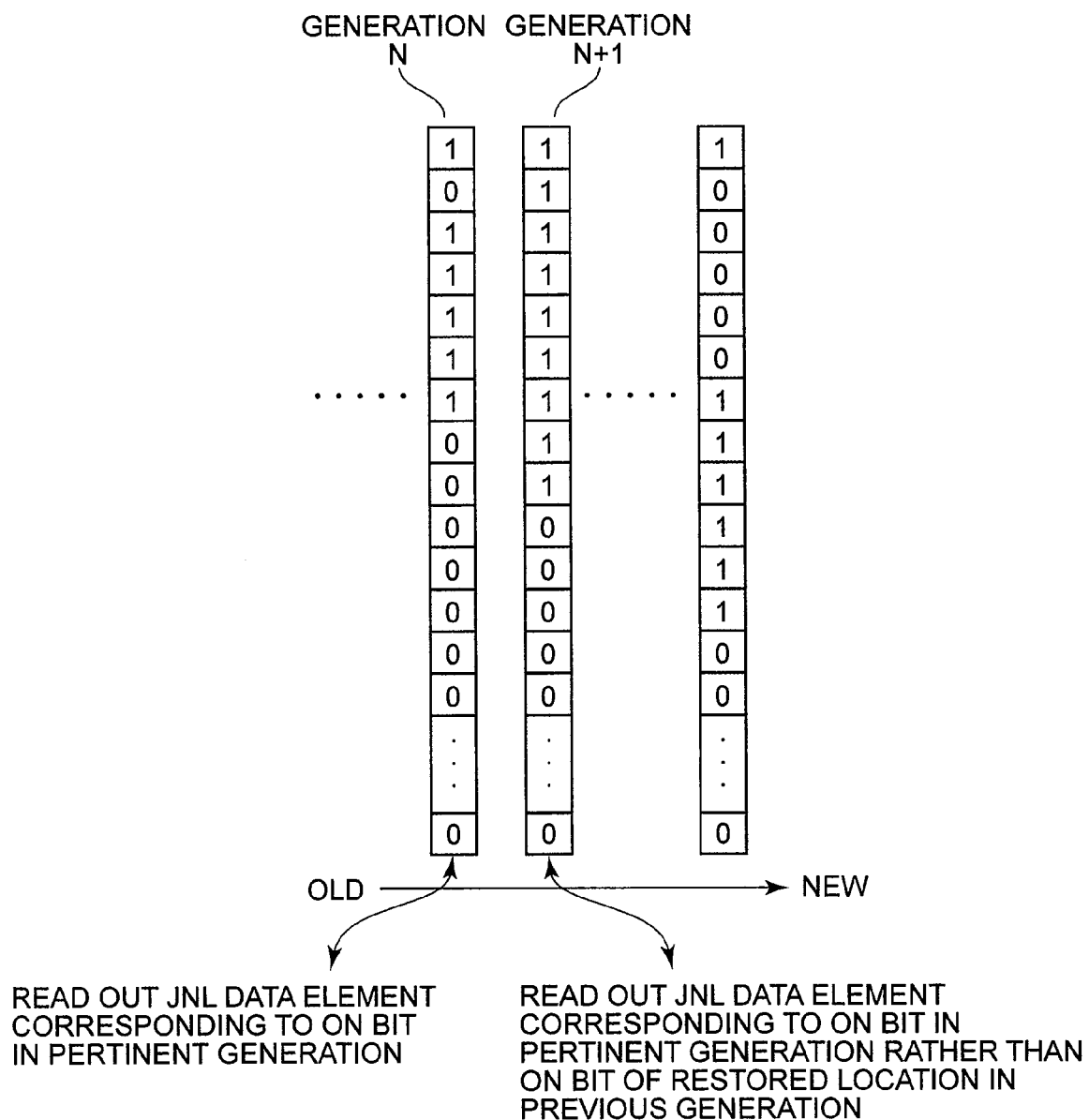
FIG. 25 is a schematic diagram of one variation of the forth embodiment.

Further, the control processor 143 can define a slot size amount of data corresponding to the R-VOL 187R in the cache memory 147 using a method that will be explained by referring to FIG. 25 instead of the method explained by referring to FIG. 24. That is, as shown in FIG. 25, the control processor 143 reads out the data elements corresponding to the ON bits in the difference BM part (N) to the target slot. Next, the control processor 143 reads out the data elements corresponding to the ON bits in the difference BM part (N+1) to the above-mentioned target slot. If the data elements have already been read out for the prior generation at this time, the data elements corresponding to the ON bits in difference BM part (N+1) are not written to the target slot. The slot size amount of data corresponding to the R-VOL 187R is defined by carrying out processing like this from generation (N) to the latest generation.

Embodiment 5

Figure 26:
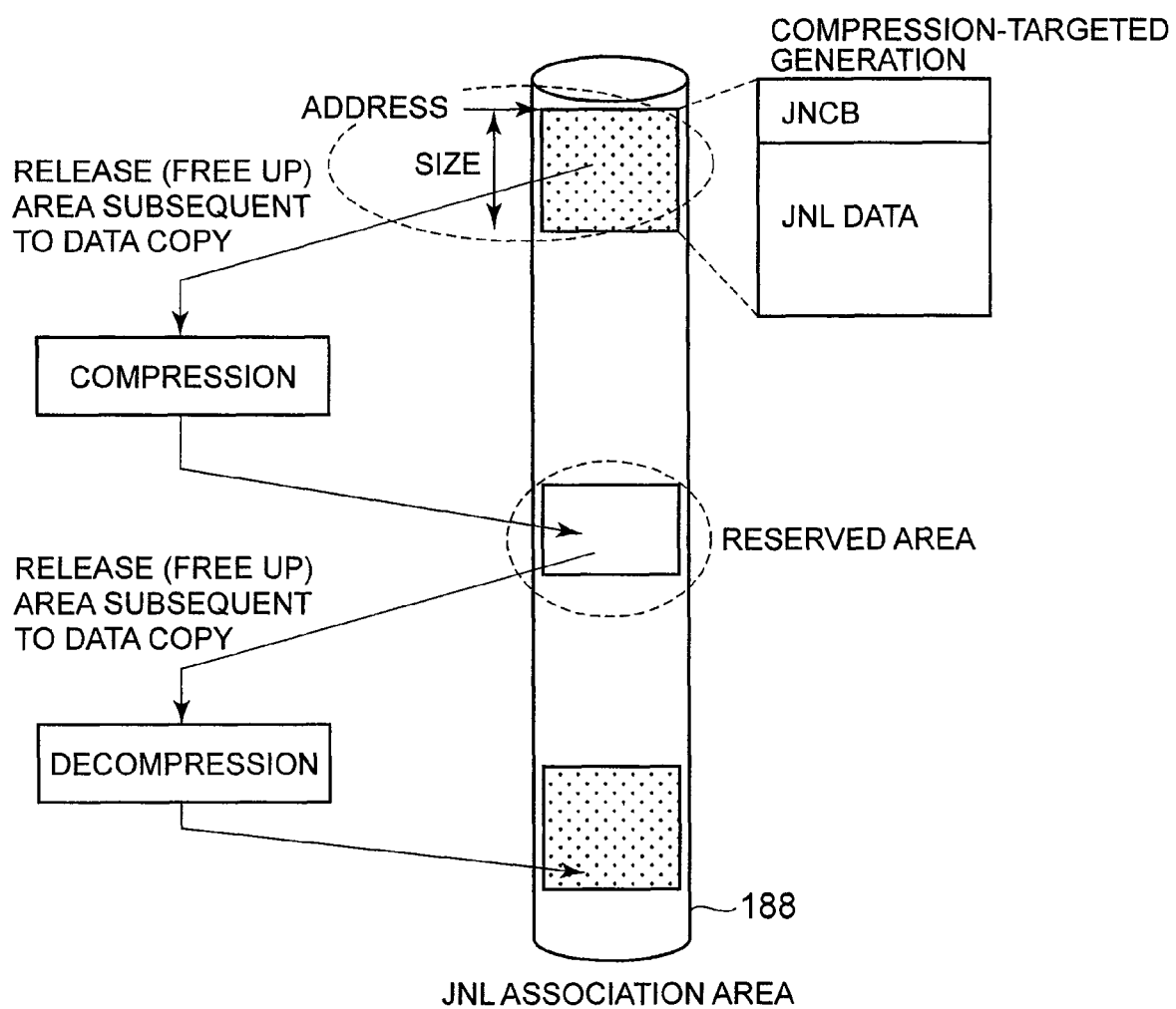
FIG. 26 shows overviews of a compression process and a decompression process carried out in a fifth embodiment of the present invention.

FIG. 26 shows an overview of a compression process and a decompression process carried out by a fifth embodiment of the present invention. These processes, for example, are carried out by a compression/decompression program not shown in the figure being executed by the control processor 143.

The control processor 143 receives a compression-targeted generation specification from either the host computer 101 or the management server 111. The control processor 143, upon receiving the compression-targeted generation specification, specifies the location and data size of the JNL data (either the inter-generational difference data or merge difference data) that corresponds to the compression-targeted generation by referencing the "start address" and "length" (the information elements recorded in the first JNL management table 207) corresponding to the compression-targeted generation. Further, the control processor 143, having the compression method (including, for example, the compression ratio) as a basis, reserves from the JNL association area 188 a free area of a size that is based on the specified data size.

Then, the control processor 143 reads out and compresses the JNCB and JNL data corresponding to the compression-targeted generation from the JNL association area 188, and stores the post-compression JNCB and JNL data in the reserved free area. Thereafter, the control processor 143 releases the read-source areas (the storage areas in which the JNCB and JNL data are stored). Consequently, this area is managed as a free area.

The control processor 143 manages for each generation the presence or absence of compression, information showing the location of the post-compression JNCB and JNL data, and the size of the pre-compression and post-compression JNCB and JNL data (pre-compression size and post-compression size) using a prescribed storage resource (for example, the control memory 145).

The control processor 143, upon receiving a decompression-targeted generation specification, reserves from the JNL association area 188 a pre-compression size free area corresponding to the decompression-targeted generation. The control processor 143 specifies the locations of the post-compression JNCB and JNL data corresponding to the decompression-targeted generation by referencing information managed by the above-mentioned prescribed storage resource, and reads out the post-compression JNCB and JNL data that is in the specified locations. Then, the control processor 143 expands this post-compression JNCB and JNL data, and stores the post-decompression JNCB and JNL data in the above-mentioned reserved free area. Thereafter, the control processor 143 releases the read-source area (the storage area in which the post-compression JNCB and JNL data are stored). Consequently, this area is managed as a free area.

The preceding is an explanation of the fifth embodiment. Furthermore, compression and/or decompression can be carried out using hardware circuits instead of or in addition to the control processor 143.

A number of embodiments of the present invention have been explained hereinabove, but these embodiments are examples for explaining the present invention, and do not purport to limit the scope of the present invention solely to these embodiments. The present invention can be put into practice in a variety of other modes.

For example, the computer system in any of the first through the fifth embodiments can be an open system or a mainframe system.

Further, for example, the storage systems 125, 161 and/or 601 can be NAS (Network Attached Storage).

Further, the S-VOL can be done away with. In that case, the reference destination when the R-VOL is accessed will be either a block inside the P-VOL or a segment in which an online update difference data element is stored instead of a block inside the S-VOL. Further, when a marker is received in this case, online update difference data will become inter-generational difference data. At this time, as a sort process, online update difference data elements can be read out in address order from the JNL sub-area and written in address order to a different JNL sub-area. If there is a S-VOL, the sort process is easy to carry out, and if there is no S-VOL, the consumption of storage capacity can be reduced by the size of the S-VOL.

What is claimed is:

1. A storage system that receives a write command and a write data element, which is one unit of write data, from a computer, comprising:
   a physical storage device that constitutes the basis of a journal area and one or more logical volumes comprising a first logical volume;
   a controller that receives the write command and the write data element from the computer, and writes the write data element to the first logical volume specified from the write command; and
   a memory,
   wherein the journal area is a storage area in which is stored a journal data element, which is a data element that is stored in any block of a plurality of blocks configuring a logical volume, or a data element that is written to the block,
   wherein the controller comprises:
   a size receiver that receives a write unit size, which is the size of the write data element received from the computer; and
   a size setting unit that sets the received write unit size in the memory for the one or more logical volumes,
   wherein the size of a journal data element stored in the journal area and based on the set write unit size is the write unit size,
   wherein, in addition to the first logical volume, there is a second logical volume that configures a pair with the first logical volume,
   wherein there is a journal management area that is a storage area based on the physical storage device,
   wherein first sub-management information is stored in the journal management area for the first logical volume,
   wherein second sub-management information for each generation is stored in the journal management area for the second logical volume,
   wherein the first sub-management information comprises first difference management information that has respective information elements corresponding to respective blocks configuring the first logical volume, the respective information elements indicate whether or not an update has occurred in a block corresponding to the information element, and the respective blocks are the set write unit size,
   wherein the second sub-management information comprises second difference management information that has respective information elements corresponding to respective blocks configuring the second logical volume, and data storage address information, the respective information elements indicate whether or not an update has occurred in the storage area corresponding to the information element, the respective blocks are the set write unit size, and the data storage address information indicates an address of a segment of the journal area,
   wherein the memory stores management information indicating locations of both the first sub-management information and the second sub-management information for each generation, and
   wherein the controller comprises:
   a write processor that receives the write command and the write data element from the computer, writes the write data element to a write-destination block inside the first logical volume specified from the write command, and if the information element corresponding to the write-destination block in the first difference management information is indicated as not updated, updates the information element to be updated; and
   a generation definition unit that executes (2-1) and (2-2) below when generation (i) of the first logical volume has been defined by the occurrence of a generation definition event:
   (2-1) adding, to the inside of the journal management area, the second sub-management information (j−1) comprising the second difference management information (j−1) corresponding to the generation (j−1) of the second logical volume, based on the write unit size for the second logical volume; and
   (2-2) executing (2-2-1) through (2-2-4) below for the respective information elements indicating that updating has been completed in the first difference management information:
   (2-2-1) updating an information element inside the second difference management information (j−1), which corresponds to an information element indicating that updating has been completed in the first difference management information, to an information element indicating that updating has been completed;
   (2-2-2) adding data storage address information to the second sub-management information, the added data storage address information indicating a save-destination segment address in the journal area of a data element stored in the block inside the second logical volume that is in the same location as the block corresponding to the information element indicating that updating has been completed in the first difference management information;
   (2-2-3) saving the data element stored in the block inside the second logical volume that is in the same location as the block corresponding to the information element indicating that updating has been completed in the first difference management information, to a segment inside the journal area indicated by the added data storage address information; and
   (2-2-4) writing, to a segment inside the second logical volume which is a save-source of the data element, the data element that corresponds to the information element indicating that updating has been completed in the first difference management information, and that is associated to the first logical volume,
   wherein an aggregate of data elements saved to the journal area in the (2-2-3) is inter-generational difference data (j−1) indicating the difference between the second logical volume of generation (j−1) and the second logical volume of generation (j−2),
   wherein a save-destination segment of the journal area in the (2-2-2) is a segment that is contiguous with a segment used as the save destination at a previous time, and
   wherein the generation definition unit executes the (2-2-1) through (2-2-4) in the address order of the blocks of the first logical volume.

2. The storage system according to claim 1, wherein the data element associated to the first logical volume in the (2-2-4) is (4-1) or (4-2) below:
- (4-1) an after journal data element that is a journal data element for the first logical volume stored inside the journal area, and that is a write data element written to the first logical volume; and
- (4-2) a data element that corresponds to an information element indicating that updating has been completed in the first difference management information and that is stored in a storage area inside the first logical volume.

3. The storage system according to claim 1,
wherein the controller further has a merge processor that merges the second sub-management information and inter-generational difference data of a plurality of generations, and
wherein for the information element and inter-generational difference data element corresponding to the same block, the merged second sub-management information and inter-generational difference data comprise an information element and an inter-generational difference data element of an older generation, but do not comprise an information element and an inter-generational difference data element of a newer generation than the generation.

4. The storage system according to claim 1, wherein the controller further has a restore processor that prepares a third logical volume indicating the first logical volume of a restore-targeted generation.

5. The storage system according to claim 4, wherein the restore processor uses the second sub-management information from the restore-targeted generation to a latest generation to create restore management information that has respective reference-destination addresses corresponding to respective blocks configuring the third logical volume, which is a virtual logical volume, and when a read request that specifies a certain block of the third logical volume is received from a computer, if there is a valid reference-destination address for the certain block, reads out the data element from the segment indicated by the reference-destination address and provides the data element to the computer, and if there is not a valid reference-destination address for the certain block, reads out the data element from the block that is in the same location as the certain block in the first or second logical volume, and provides the data element to the computer.

6. The storage system according to claim 1,
wherein the controller stores journal management information indicating a location of sub-management information for respective generations of the logical volume in the memory, and stores the sub-management information in a journal management area based on the physical storage device, and
wherein the sub-management information comprises difference management information having respective information elements corresponding to respective blocks configuring the logical volume, and data storage address information, the respective information elements indicate whether or not an update has occurred in a block corresponding to the information element, and the data storage address information indicates an address of a segment in the journal area in which a corresponding journal data element is stored.

7. The storage system according to claim 1,
wherein the controller uses sub-management information from restore-targeted generation to a latest generation to create restore management information that has respective reference-destination addresses corresponding to respective blocks configuring a third logical volume, which is a virtual logical volume, and when a read request that specifies a certain block of the third logical volume is received from a computer, if there is a valid reference-destination address for the certain block, reads out the data element from the segment indicated by the reference-destination address and provides the data element to the computer, and if there is not a valid reference-destination address for the certain block, reads out the data element from the block that is in the same location as the certain block in the first logical volume or the second logical volume, which is a full backup thereof, and provides the data element to the computer, and
wherein the sub-management information comprises difference management information that has respective information elements corresponding to respective blocks configuring the logical volume, and data storage address information, the respective information elements indicate whether or not an update has occurred in a block corresponding to the information element, and the data storage address information indicates an address of a segment in the journal area in which a corresponding journal data element is stored.

8. A storage system that receives a write command and a write data element, which is one unit of write data, from a computer, comprising:
- a physical storage device that constitutes the basis of a journal area and one or more logical volumes comprising a first logical volume;
- a controller that receives the write command and the write data element from the computer, and writes the write data element to the first logical volume specified from the write command; and
- a memory,
wherein the journal area is a storage area in which is stored a journal data element, which is a data element that is stored in any block of a plurality of blocks configuring a logical volume, or a data element that is written to the block,
wherein the controller comprises:
- a size receiver that receives a write unit size, which is the size of the write data element received from the computer; and
- a size setting unit that sets the received write unit size in the memory for the one or more logical volumes, and
wherein the size of a journal data element stored in the journal area and based on the set write unit size is the write unit size,
wherein, in addition to the first logical volume, there is a second logical volume that configures a pair with the first logical volume,
wherein there is a journal management area that is a storage area based on the physical storage device,
wherein first sub-management information is stored in the journal management area for the first logical volume,
wherein second sub-management information for each generation is stored in the journal management area for the second logical volume,
wherein the first sub-management information comprises first difference management information that has respective information elements corresponding to respective blocks configuring the first logical volume, the respective information elements indicate whether or not an update has occurred in a block corresponding to the information element, and the respective blocks are the set write unit size, wherein the second sub-management information comprises second difference management information that has respective information elements corresponding to respective blocks configuring the second logical volume, and data storage address information, the respective information elements indicate whether or not an update has occurred in the storage area corresponding to the information element, the respective blocks are the set write unit size, and the data storage address information indicates an address of a segment of the journal area, wherein the memory stores management information indicating locations of both the first sub-management information and the second sub-management information for each generation, wherein the controller comprises:

a write processor that receives the write command and the write data element from the computer, writes the write data element to a write-destination block inside the first logical volume specified from the write command, and if the information element corresponding to the write-destination block in the first difference management information is indicated as not updated, updates the information element to be updated; and a generation definition unit that executes (2-1) and (2-2) below when generation (j) of the first logical volume has been defined by the occurrence of a generation definition event:

(2-1) adding, to the inside of the journal management area, the second sub-management information (j−1) comprising the second difference management information (j−1) corresponding to the generation (j−1) of the second logical volume, based on the write unit size for the second logical volume; and (2-2) executing (2-2-1) through (2-2-4) below for the respective information elements indicating that updating has been completed in the first difference management information:

(2-2-1) updating an information element inside the second difference management information (j−1), which corresponds to an information element indicating that updating has been completed in the first difference management information, to an information element indicating that updating has been completed;

(2-2-2) adding data storage address information to the second sub-management information, the added data storage address information indicating a save-destination segment address in the journal area of a data element stored in the block inside the second logical volume that is in the same location as the block corresponding to the information element indicating that updating has been completed in the first difference management information;

(2-2-3) saving the data element stored in the block inside the second logical volume that is in the same location as the block corresponding to the information element indicating that updating has been completed in the first difference management information, to a segment inside the journal area indicated by the added data storage address information; and (2-2-4) writing, to a segment inside the second logical volume which is a save-source of the data element, the data element that corresponds to the information element indicating that updating has been completed in the first difference management information, and that is associated to the first logical volume, wherein an aggregate of data elements saved to the journal area in the (2-2-3) is inter-generational difference data (j−1) indicating the difference between the second logical volume of generation (j−1) and the second logical volume of generation (j−2), wherein the controller further has a restore processor that prepares a third logical volume indicating the first logical volume of a restore-targeted generation, wherein the data stored in the third logical volume is backed up in a slot size unit that is larger than the write unit size, wherein the memory comprises a cache memory, and wherein the restore processor reserves, in the cache memory, a slot that is a region of the slot size, stores a plurality of data elements corresponding to the restore-targeted generation in the reserved slot, and backs up the slot size worth of data, which is the data element group stored in the slot.

9. A storage system that receives a write command and a write data element, which is one unit of write data, from a computer, comprising:

a physical storage device that constitutes the basis of a journal area and one or more logical volumes comprising a first logical volume;

a controller that receives the write command and the write data element from the computer, and writes the write data element to the first logical volume specified from the write command; and a memory, wherein the journal area is a storage area in which is stored a journal data element, which is a data element that is stored in any block of a plurality of blocks configuring a logical volume, or a data element that is written to the block, wherein the controller comprises:

a size receiver that receives a write unit size, which is the size of the write data element received from the computer; and a size setting unit that sets the received write unit size in the memory for the one or more logical volumes, wherein the size of a journal data element stored in the journal area and based on the set write unit size is the write unit size, wherein, in addition to the first logical volume, there is a second logical volume that configures a pair with the first logical volume, wherein there is a journal management area that is a storage area based on the physical storage device, wherein first sub-management information is stored in the journal management area for the first logical volume, wherein second sub-management information for each generation is stored in the journal management area for the second logical volume, wherein the first sub-management information comprises first difference management information that has respective information elements corresponding to respective blocks configuring the first logical volume, the respective information elements indicate whether or not an update has occurred in a block corresponding to the information element, and the respective blocks are the set write unit size, wherein the second sub-management information comprises second difference management information that has respective information elements corresponding to respective blocks configuring the second logical volume, and data storage address information, the respective information elements indicate whether or not an update has occurred in the storage area corresponding to the information element, the respective blocks are the set write unit size, and the data storage address information indicates an address of a segment of the journal area, wherein the memory stores management information indicating locations of both the first sub-management information and the second sub-management information for each generation, wherein the controller comprises:

a write processor that receives the write command and the write data element from the computer, writes the write data element to a write-destination block inside the first logical volume specified from the write command, and if the information element corresponding to the write-destination block in the first difference management information is indicated as not updated, updates the information element to be updated; and a generation definition unit that executes (2-1) and (2-2) below when generation (j) of the first logical volume has been defined by the occurrence of a generation definition event:

(2-1) adding, to the inside of the journal management area, the second sub-management information (j–1) comprising the second difference management information (j–1) corresponding to the generation (j–1) of the second logical volume, based on the write unit size for the second logical volume; and (2-2) executing (2-2-1) through (2-2-4) below for the respective information elements indicating that updating has been completed in the first difference management information:

(2-2-1) updating an information element inside the second difference management information (j–1), which corresponds to an information element indicating that updating has been completed in the first difference management information, to an information element indicating that updating has been completed;

(2-2-2) adding data storage address information to the second sub-management information, the added data storage address information indicating a save-destination segment address in the journal area of a data element stored in the block inside the second logical volume that is in the same location as the block corresponding to the information element indicating that updating has been completed in the first difference management information;

(2-2-3) saving the data element stored in the block inside the second logical volume that is in the same location as the block corresponding to the information element indicating that updating has been completed in the first difference management information, to a segment inside the journal area indicated by the added data storage address information; and (2-2-4) writing, to a segment inside the second logical volume which is a save-source of the data element, the data element that corresponds to the information element indicating that updating has been completed in the first difference management information, and that is associated to the first logical volume, wherein an aggregate of data elements saved to the journal area in the (2-2-3) is inter-generational difference data (j–1) indicating the difference between the second logical volume of generation (j–1) and the second logical volume of generation (j–2), and wherein the controller reserves, in the physical storage device, a first region for storing post-compression information in which the second sub-management information and inter-generational difference data belonging to a compression-targeted generation are compressed, reads out the second sub-management information and inter-generational difference data belonging to the compression-targeted generation from a second region in which the second sub-management information and inter-generational difference data belonging to the compression-targeted generation are stored, creates the post-compression information by compressing the read-out second sub-management information and inter-generational difference data, stores the created post-compression information in the second region, and manages the second region as a free space.

10. A storage system that receives a write command and a write data element, which is one unit of write data, from a computer, comprising:

a physical storage device that constitutes the basis of a journal area and one or more logical volumes comprising a first logical volume;

a controller that receives the write command and the write data element from the computer, and writes the write data element to the first logical volume specified from the write command; and a memory, wherein the journal area is a storage area in which is stored a journal data element, which is a data element that is stored in any block of a plurality of blocks configuring a logical volume, or a data element that is written to the block, wherein the controller comprises:

a size receiver that receives a write unit size, which is the size of the write data element received from the computer; and a size setting unit that sets the received write unit size in the memory for the one or more logical volumes, wherein the size of a journal data element stored in the journal area and based on the set write unit size is the write unit, and wherein the controller saves a plurality of data elements stored in a plurality of update-targeted blocks inside the second logical volume in the address order of the blocks when a generation definition event occurs, and makes a save-destination segment a segment that is contiguous with a segment used as the save destination at a previous time.

* * * * *